US012726414B2

(12) United States Patent
Farooq et al.

(10) Patent No.: US 12,726,414 B2
(45) Date of Patent: Sep. 1, 2026

(54) METHOD FOR IDENTIFYING POTENTIAL MACHINE LEARNING MODEL CANDIDATES TO COLLABORATE IN TELECOM NETWORKS

(71) Applicant: Telefonaktiebolaget LM Ericsson (publ), Stockholm (SE)

(72) Inventors: Hasan Farooq, Santa Clara, CA (US); Julien Forgeat, San Jose, CA (US); Meral Shirazipour, Santa Clara, CA (US); Shruti Bothe, Santa Clara, CA (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 474 days.

(21) Appl. No.: 18/247,639

(22) PCT Filed: Oct. 7, 2020

(86) PCT No.: PCT/IB2020/059438

§ 371 (c)(1),
(2) Date: Mar. 31, 2023

(87) PCT Pub. No.: WO2022/074434

PCT Pub. Date: Apr. 14, 2022

(65) Prior Publication Data

US 2024/0196231 A1 Jun. 13, 2024

(51) Int. Cl.
*H04L 41/16* (2022.01)
*H04B 7/06* (2006.01)
(Continued)

(52) U.S. Cl.
CPC ........... *H04L 41/16* (2013.01); *H04B 7/0634* (2013.01); *H04L 41/40* (2022.05); *H04W 16/18* (2013.01);
(Continued)

(58) Field of Classification Search
CPC ....... H04L 41/16; H04L 41/40; H04L 41/147; H04L 41/149; H04B 7/0634; H04W 16/18; H04W 24/02
(Continued)

(56) References Cited

U.S. PATENT DOCUMENTS 9,538,401 B1 1/2017 Ouyang et al.
2013/0290223 A1* 10/2013 Chapelle ................ G06N 20/00 706/12
(Continued)

FOREIGN PATENT DOCUMENTS

| | | | | |
|---|---|---|---|---|
| EP | 3133870 B1 | | 9/2019 | |
| WO | WO-2010004509 A1 | * | 1/2010 | ............... G06N 3/02 |
| WO | 2020/169211 A1 | | 8/2020 | |

OTHER PUBLICATIONS

Aliu, et al., "A Survey of Self Organisation in Future Cellular Networks," IEEE Communications Surveys & Tutorials, vol. 15, No. 1, Jan. 2013, pp. 336-361.
(Continued)

*Primary Examiner* — Asad M Nawaz
*Assistant Examiner* — Hugh Mark Ashley
(74) *Attorney, Agent, or Firm* — Nicholson De Vos Webster & Elliott LLP

(57) ABSTRACT

A method of a collaboration server for identifying cells of a mobile network for machine learning collaboration is provided. The mobile network includes a plurality of cells. The method includes managing collection of features for the plurality of cells to generate at least one feature vector for each of the plurality of cells, determining a cluster of cells within the plurality of cells based on similarity in feature vectors between at least two cells in the plurality of cells, sending cluster information to each cell of the cluster, receiving cluster pre-check information from each cell of the cluster, and determining a first cell and a second cell in the
(Continued)

cluster to collaborate for machine learning based on the received pre-check information.

19 Claims, 9 Drawing Sheets

(51) Int. Cl.
*H04L 41/147* (2022.01)
*H04L 41/149* (2022.01)
*H04L 41/40* (2022.01)
*H04W 16/18* (2009.01)
*H04W 24/02* (2009.01)

(52) U.S. Cl.
CPC .......... *H04W 24/02* (2013.01); *H04L 41/147* (2013.01); *H04L 41/149* (2022.05)

(58) Field of Classification Search
USPC .......................................................... 370/329
See application file for complete search history.

(56) References Cited

U.S. PATENT DOCUMENTS

| | | | | |
|---|---|---|---|---|
| 2021/0160142 | A1* | 5/2021 | Thai | H04L 41/0813 |
| 2021/0224584 | A1* | 7/2021 | Pouyan | G06F 18/214 |
| 2022/0012116 | A1* | 1/2022 | Maeda | G06F 11/0709 |

OTHER PUBLICATIONS

Banko, et al., "Scaling to Very Very Large Corpora for Natural Language Disambiguation," Proc. of ACL, Jul. 2001, pp. 1-8.
Hämäläinen, et al., "LTE Self-Organising Networks (SON): Network Management Automation for Operational Efficiency," Description, John Wiley & Sons, Jan. 2012, 3 pages.
Hughes, et al., "Generative Adversarial Learning for Machine Learning empowered Self Organizing 5G Networks," 2019 International Conference on Computing, Networking and Communications (ICNC), Honolulu, HI, USA, Feb. 18-21, 2019, pp. 282-286.
Imran, et al., "Challenges in 5g: how to empower son with big data for enabling 5g," IEEE Network, vol. 28, No. 6, Nov. 2014, pp. 27-33.
Klaine, et al., "A Survey of Machine Learning Techniques Applied to Self-Organizing Cellular Networks," IEEE Communications Surveys & Tutorials, vol. 19, No. 4, Fourth Quarter, Aug. 25, 2017, pp. 2392-2431.
Mismar, et al., "Partially Blind Handovers for mmWave New Radio Aided by Sub-6 Ghz LTE Signaling," 2018 IEEE International Conference on Communications Workshops (ICC Workshops), Kansas City, MO, Jul. 18, 2018, pp. 1-5.
Naranjo, et al., "Interference map estimation using spatial interpolation of MDT reports in cognitive radio networks," 2014 IEEE Wireless Communications and Networking Conference (WCNC), Apr. 6-9, 2014, pp. 1496-1501.
Pan, et al., "A survey on transfer learning," IEEE Transactions on knowledge and data engineering, vol. 22, No. 10, Oct. 2010, pp. 1345-1359.
Parera, et al., "Transfer Learning for Channel Quality Prediction," 2019 IEEE International Symposium on Measurements & Networking (M&N), Catania, Italy, Jul. 8-10, 2019, pp. 1-6.
Parera, et al., "Transferring knowledge for tilt-dependent radio map prediction," 2018 IEEE Wireless Communications and Networking Conference (WCNC), Barcelona, Jun. 11, 2018, pp. 1-6.
Rydén, et al., "Predicting strongest cell on secondary carrier using primary carrier data," 2018 IEEE Wireless Communications and Networking Conference Workshops (WCNCW), Barcelona, Apr. 2018, pp. 137-142.
Svahn, et al., "Inter-Frequency Radio Signal Quality Prediction for Handover, Evaluated in 3GPP LTE," 2019 IEEE 89th Vehicular Technology Conference (VTC2019-Spring), Kuala Lumpur, Malaysia, Mar. 1, 2019, pp. 1-6.
Vilalta, et al., "A perspective view and survey of meta-learning," Artificial Intelligence Review, vol. 18, No. 2, Sep. 2002, pp. 77-95.
Yang, et al., "Generative-Adversarial-Network-Based Wireless Channel Modeling: Challenges and Opportunities," IEEE Communications Magazine, vol. 57, No. 3, Mar. 2019, pp. 22-27.

* cited by examiner

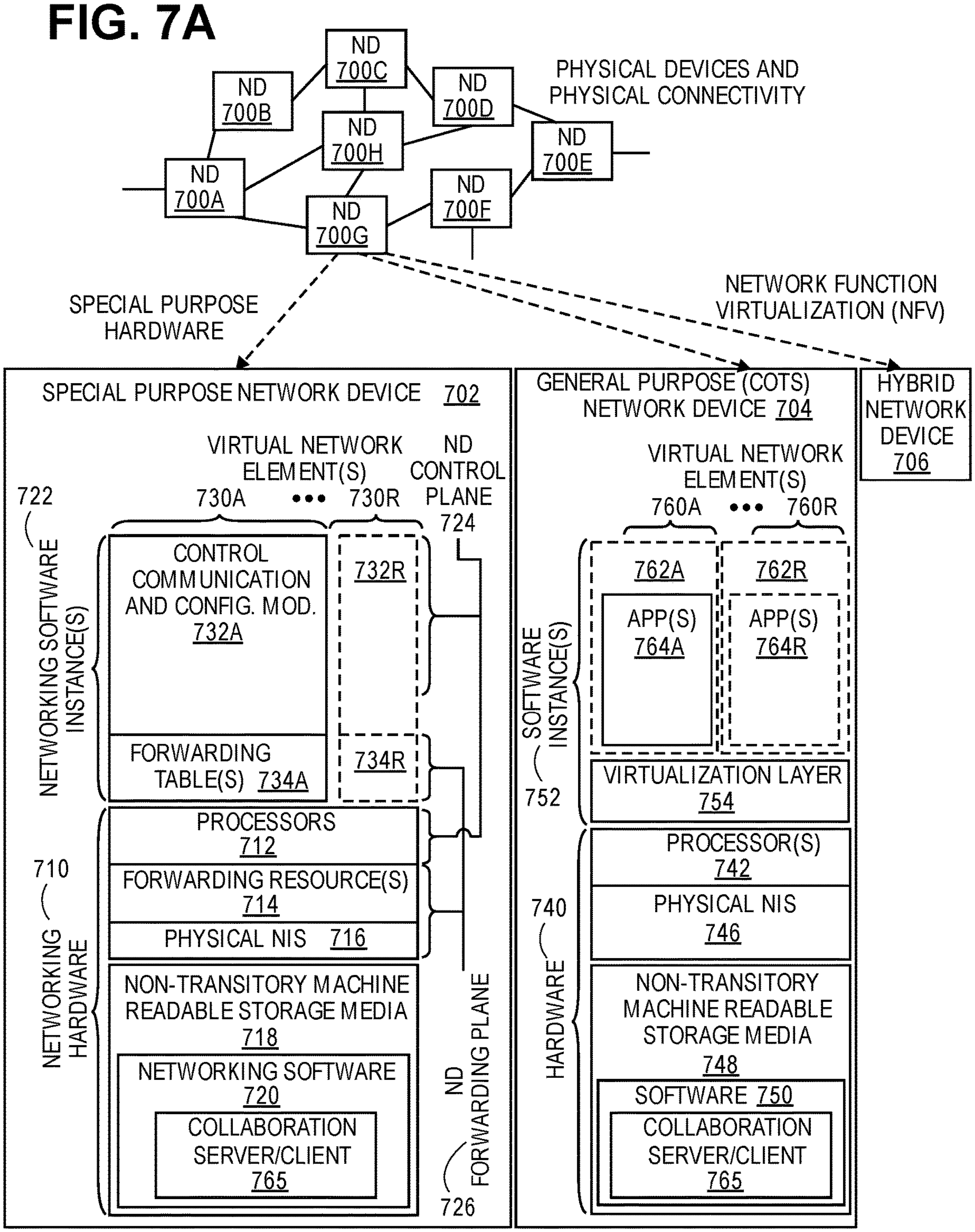

FIG. 7A

ND 700A
ND 700B
ND 700C
ND 700D
ND 700E
ND 700F
ND 700G
ND 700H
PHYSICAL DEVICES AND PHYSICAL CONNECTIVITY
SPECIAL PURPOSE HARDWARE
NETWORK FUNCTION VIRTUALIZATION (NFV)

SPECIAL PURPOSE NETWORK DEVICE 702
VIRTUAL NETWORK ELEMENT(S)
730A ••• 730R
ND CONTROL PLANE 724
722 NETWORKING SOFTWARE INSTANCE(S)
CONTROL COMMUNICATION AND CONFIG. MOD. 732A
732R
FORWARDING TABLE(S) 734A
734R
710 NETWORKING HARDWARE
PROCESSORS 712
FORWARDING RESOURCE(S) 714
PHYSICAL NIS 716
NON-TRANSITORY MACHINE READABLE STORAGE MEDIA 718
NETWORKING SOFTWARE 720
COLLABORATION SERVER/CLIENT 765
ND FORWARDING PLANE 726

GENERAL PURPOSE (COTS) NETWORK DEVICE 704
VIRTUAL NETWORK ELEMENT(S)
760A ••• 760R
752 SOFTWARE INSTANCE(S)
762A
APP(S) 764A
762R
APP(S) 764R
VIRTUALIZATION LAYER 754
740 HARDWARE
PROCESSOR(S) 742
PHYSICAL NIS 746
NON-TRANSITORY MACHINE READABLE STORAGE MEDIA 748
SOFTWARE 750
COLLABORATION SERVER/CLIENT 765

HYBRID NETWORK DEVICE 706

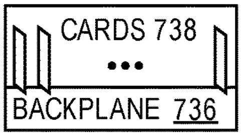

FIG. 7B

CENTRALIZED APPROACH (SDN) 774

DISTRIBUTED APPROACH 772

APPLICATION(S) 788

APPLICATION LAYER 786

NORTH BOUND INTERFACE 784

VIRTUAL NETWORK(S) 792

CENTRALIZED CONTROL PLANE 776

NETWORK CONTROLLER 778

CENTRALIZED REACHABILITY AND FORWARDING INFO. MOD. 779

COLLABORATION SERVER 781

SOUTH BOUND INTERFACE 782

DATA PLANE 780

NE 770A

NE 770B

NE 770C

NE 770D

NE 770E

NE 770F

NE 770G

NE 770H

NE 770I

NE 770D

NE 770E

NE 770F

SINGLE VNE 770T

ND 700A

VNE 770A.1

ND 700H

VNE 770H.1

METHOD FOR IDENTIFYING POTENTIAL MACHINE LEARNING MODEL CANDIDATES TO COLLABORATE IN TELECOM NETWORKS

CROSS-REFERENCE TO RELATED APPLICATIONS

This application is a National stage of International Application No. PCT/IB2020/059438, filed Oct. 7, 2020, which is hereby incorporated by reference.

TECHNICAL FIELD

Embodiments of the invention relate to the field of machine learning; and more specifically, to a process and system for identifying candidates for collaboration using machine learning techniques in a network.

BACKGROUND ART

Mobile cellular telecommunication networks, referred to herein as "mobile networks," are large networks encompassing a large number of computing devices to enable mobile devices that connect wirelessly to the mobile network to communicate with other computing devices including both other mobile devices and other types of computing devices. The mobile devices, e.g., user equipment (UE) such as mobile phones, tablets, laptops, and similar devices, may frequently travel and shift connection points with the mobile network in a manner that maintains continuous connections for the applications of the mobile devices. Typically, the mobile devices connect to the mobile network via radio access network (RAN) base stations, which provides connectivity to any number of mobile devices for a local area or 'cell.' Managing and configuring the mobile network including the cells of the mobile network is an administrative challenge as each cell can have different geographic and technological characteristics.

Machine learning is an area of artificial intelligence (AI) in the field of computer science that applies algorithms and statistical models that are not task specific to perform specific tasks without the use of instructions that are specific to the task to be performed. The algorithms and statistical models can employ pattern recognition, inference, and similar techniques to perform a task rather than specific instructions for the task. Many machine learning algorithms build a model based on training data. Training data can be a set of sample or starting data with known properties such as correlation with a task outcome. The training data is input into the algorithm and model to 'train' the AI to perform a task. Machine learning algorithms can be applied to tasks or applications, such as email management or image recognition, where it is difficult or infeasible to develop a conventional algorithm to effectively perform the task.

SUMMARY

In one embodiment, a method of a collaboration server for identifying cells of a mobile network for machine learning collaboration is provided. The mobile network includes a plurality of cells. The method includes managing collection of features for the plurality of cells to generate at least one feature vector for each of the plurality of cells, determining a cluster of cells within the plurality of cells based on similarity in feature vectors between at least two cells in the plurality of cells, sending cluster information to each cell of the cluster, receiving cluster pre-check information from each cell of the cluster, and determining a first cell and a second cell in the cluster to collaborate for machine learning based on the received pre-check information.

In another embodiment, a network device for executing the collaboration client for identifying cells of a mobile network for machine learning collaboration is provided. The mobile network includes a plurality of cells. The network device includes a non-transitory computer-readable medium having stored therein a collaboration client, and a processor coupled to the non-transitory computer-readable medium, the processor to execute the collaboration client, the collaboration client to receive clustering information from a collaboration server, perform a collaboration pre-check with each cluster cell identified in the clustering information, send pre-check results to the collaboration server, receive collaboration information from the collaboration server, and initiate transfer learning with cells identified in the collaboration information.

In one embodiment, an electronic device to execute a plurality of virtual machines is provided. The plurality of virtual machines execute a method of a collaboration server for identifying cells of a mobile network for machine learning collaboration. The mobile network includes a plurality of cell. The electronic device includes a non-transitory computer-readable medium having stored therein a collaboration server, and a processor to execute the plurality of virtual machines. One of the plurality of virtual machines executes the collaboration server. The collaboration server manages a collection of features for the plurality of cells to generate at least one feature vector for each of the plurality of cells, determines a cluster of cells within the plurality of cells based on similarity in feature vectors between at least two cells in the plurality of cells, sends cluster information to each cell of the cluster, receives cluster pre-check information from each cell of the cluster, and determines a first cell and a second cell in the cluster to collaborate for machine learning based on the received pre-check information.

In one embodiment, a computing device implements a control plane of a software defined networking (SDN) network. The computing device executes a method of a collaboration server for identifying cells of a mobile network for machine learning collaboration. The mobile network has a plurality of cells. The computing device includes a non-transitory computer readable medium having stored therein a collaboration server, and a processor coupled to the non-transitory computer readable medium. The processor executes the collaboration server. The collaboration server manages collection of features for the plurality of cells to generate at least one feature vector for each of the plurality of cells, determines a cluster of cells within the plurality of cells based on similarity in feature vectors between at least two cells in the plurality of cells, sends cluster information to each cell of the cluster, receives cluster pre-check information from each cell of the cluster, and determines a first cell and a second cell in the cluster to collaborate for machine learning based on the received pre-check information.

BRIEF DESCRIPTION OF THE DRAWINGS

The invention may best be understood by referring to the following description and accompanying drawings that are used to illustrate embodiments of the invention. In the drawings:

FIG. 7A illustrates connectivity between network devices (NDs) within an exemplary network, as well as three exemplary implementations of the NDs, according to some embodiments of the invention.

FIG. 7B illustrates an exemplary way to implement a special-purpose network device according to some embodiments of the invention.

DETAILED DESCRIPTION

Figure 1:
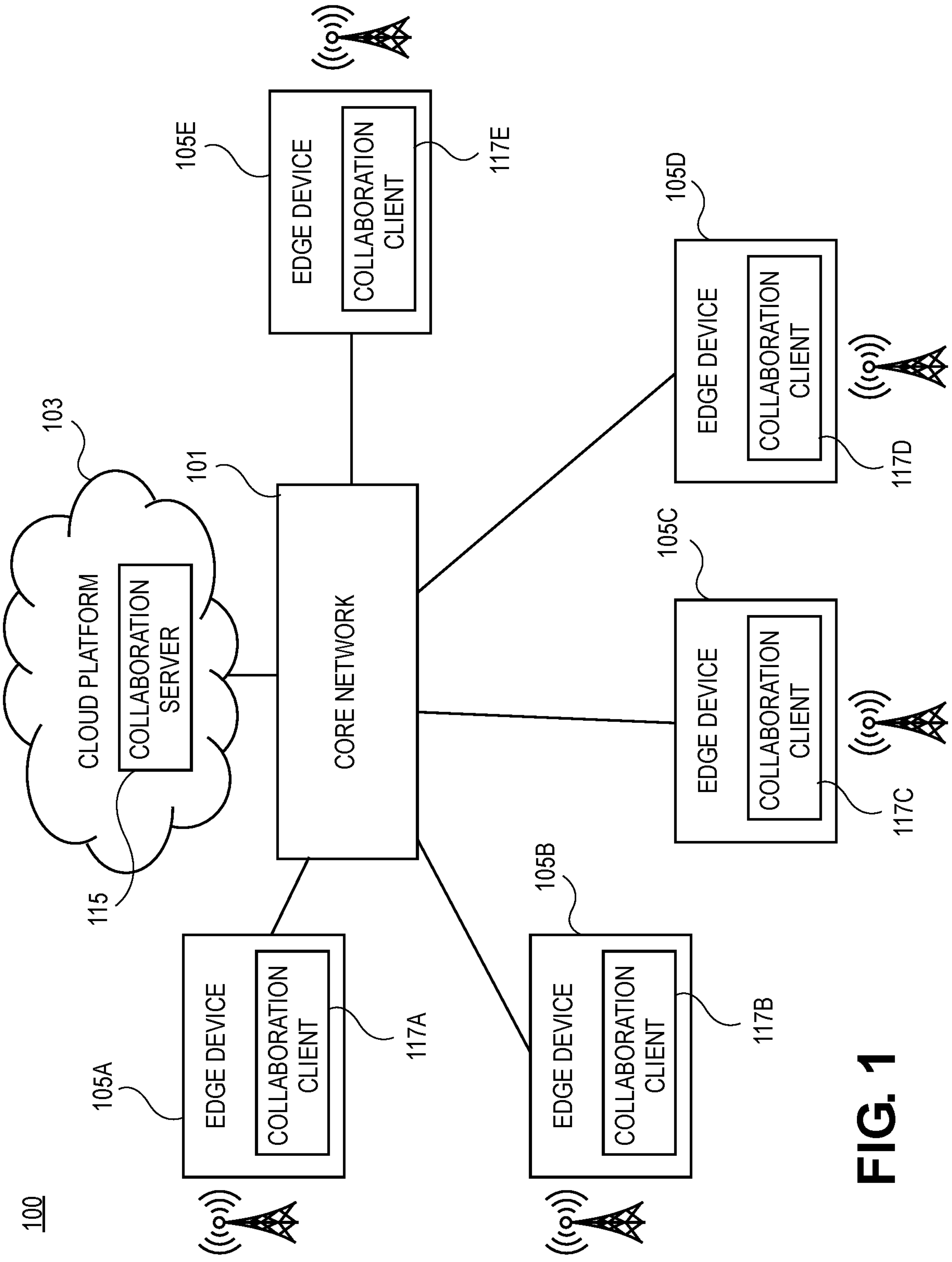
FIG. 1 is a diagram of one embodiment of a mobile network implementing machine learning collaboration.

The following description describes methods and apparatus for improving the operation mobile networks. In particular the embodiments provide a process and system for establishing machine-learning collaboration between edge nodes in a mobile network. In particular, the process and embodiment improve and automate clustering of edge nodes to establish transfer learning between the clustered edge nodes. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals—such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

The embodiments utilize artificial intelligence to improve the operation of mobile networks. Artificial intelligence (AI) is important in the realization of zero-touch automated mobile networks (i.e., self-organizing networks (SONs)) by transforming the way mobile networks are configured, operated, optimized, troubleshooted and managed. AI can be utilized to achieve the zero-touch automation for the increasingly complex, difficult, and expensive to manage emerging mobile networks and associated mobile network technologies. The embodiments utilize machine-learning (ML) models and leverage the ML models to develop a holistic automation engine for mobile network operation and optimization that can replace the existing far from optimal, laborious, and highly error prone operation and optimization process with an almost zero touch deep automation. To accomplish zero touch deep automation, the embodiments work with many SON functions namely CCO (Coverage & Capacity Optimization), MLB (Mobility Load Balancing), MRO (Mobility Robustness Optimization), ICIC (Inter-cell Interference Coordination) and Minimization of Drive Test (MDT), which have been standardized by the 3$^{rd}$ Generation Partnership Process (3GPP).

Secondary Carrier Prediction (SCP) is one of the SON use cases that falls under the umbrella of MRO, which aims to enhance the mobility experience. In networks with different frequency bands allocated to the base stations (BS), User Equipment's (UEs) must periodically scan for suitable cells in their vicinity to identify and connect to the BS that provide the highest data rates. Denser networks and multiple frequencies make it challenging to ensure the best possible cell and frequency carrier assignment to a UE without the UE needing to perform an excessive amount of inter-frequency measurements and reporting. This measurement gap affects throughput as well as the energy consumption of the UEs. An ML driven SCP solution can circumvent this issue by training on historical UE measurements to predict the strongest cell of a secondary carrier based on only measurements on the serving carrier. However, in this case, each cell has its own ML model due to the different features such as radio propagation conditions and geometry of the cell. Similarly tilt optimization is another SON function under CCO use case wherein tilt is predicted by an ML algorithm. This is done by developing a data-driven ML model of reference signal received power (RSRP) based on tilts of BS.

One of the issues faced by Machine learning SON algorithms is that they require large amounts of labeled training data. More data usually results in better and accurate models. Due to this, SON fueled by machine learning algorithms needs an incredible amount of true data, often with very different data types. However, one of the key challenges faced by this approach is data scarcity since labeled real data is often not readily available. This is one of the primary reasons why operators only try a limited range of configurations in a live mobile network. Mobile Cellular Network (MCN) operators dedicate a few cells in the network for experiments to gather data to learn the behavior of service quality after some configuration change (e.g., antenna tilt angle, transmission power, antenna height). However, experimenting on many BSs to gather data can degrade the performance of the network and degrade the user experience. Similarly, user distribution is another issue. Some cells have fewer active users e.g., small cells due to small coverage footprints and as a result, the labeled data obtained is scarce.

When a large number of ML driven SON functions are deployed in a BS, the network has an opportunity to pool the data of machine learning models. The challenge to be addressed is to find similar models or cells that can share knowledge and learn from each other to improve their performance. Similarly, when a new cell is configured, identifying a pre-existing SON ML model in the pool which can help in training this new model with the acquired knowledge rather than starting from scratch is an issue that needs to be addressed and that the embodiments can be applied to.

The sharing of information between ML models of base stations and between base stations is referred to herein as collaborative machine learning or transfer learning wherein ML models for SON functions running in different cells collaborate with one another to improve their performance. An important idea of the embodiments is to utilize similarities among the cells as well as user data to address the aforementioned challenges. The similarities in cells could exist because of many factors like hardware/software used (e.g., the type and the version deployed), deployment topology, weather conditions, user demographics, traffic trends and so on. Since it is very hard to input all of these factors into an automated method, the embodiments provide a process and system to discover those factors and find similar cells that can collaborate with each other (as these factors directly/indirectly influence the three main factors used in the embodiments). In this way the collaborating cells can share their data as well as the trained model parameters. A straightforward approach can be learning from data of all cells running the same class of ML SON function however the embodiments are not limited to this case, because all cells differ from one another in terms of propagation characteristics, user-density and demography, mobility characteristics, and similar features. Even when cells are similar the decision to collaborate should take into account additional factors like cost of transfer learning (e.g., signaling overhead) since two SON models lying very distant from one another can have high cost of transferring the data between them or sharing the model parameters. The embodiments address a difficult aspect of how to identify the collaborating cells wherein their knowledge sharing is beneficial.

The existing solutions that address training data sparsity issues in wireless cellular networks are limited to using interpolation techniques or Generative Adversarial Networks (GANs). These methods are expected to perform well in cases where the sparse data has at least some overlapping latent features. However, for situations where this is not the case, alternatives like a transfer-learning paradigm as supported in the embodiments must be used. SON ML models require vast amounts of labeled training data. Consequently, the utility of existing solutions is limited by a fundamental challenge faced by research community: sparsity of training data. One of the ways to overcome this challenge is transfer learning wherein SON ML models running in the edges can collaborate with one another through transfer learning and improve their performance.

A basic approach to transfer learning is learning from data or model trained on all the cells data. A drawback to this solution is that since all the cells differ from one another in terms of propagation characteristics, user-density and demography, mobility characteristics and other characteristics, a basic approach would be ineffective. Even if the cells are similar, factors like communication cost needs to be taken care of since two SON models lying very distant from one another can have high cost of transferring the data between them or sharing the model parameters. The embodiments address these issues by identifying the potential collaborating cells wherein their knowledge sharing is beneficial.

The embodiments address the issues of the existing art by providing a method to address the challenge of identifying the collaborating cells for transfer learning wherein their knowledge shared is beneficial. This in turn can cope with data-scarcity issue in ML when employed for the mobile network domain where training data is scare, expensive to gather/store/distribute and has latent feature space that is different than images and natural language processing (NLP) data. The embodiments are based on the notion that cells with similar clutter distribution, training dataset distribution, and trained ML model hyper-parameters, have a significant potential to collaborate with one another via transfer learning. The embodiments provide a method that uses the aforementioned factors in identifying cells that can collaborate with each other keeping in view associated costs of transfer learning. As a result, the embodiment provide advantages including identification of cells that are similar in properties which can collaborate with each other for knowledge transfer with the intent of better model training via transfer learning, and prioritizing transfer learning among cells based on associated costs involved like signaling overhead.

FIG. 1 is a diagram of an example mobile network implementing a collaboration process. The mobile network 100 includes a set of edge devices 105A-E, a core network 101, and a cloud platform 103. One skilled in the art would appreciate that the mobile network 100 as illustrated in FIG. 1 is simplified for sake of illustration and that many additional electronic devices, functions, and components would be involved in the operation of the mobile network. The mobile network 100 can implement any communication technology such as 3G, 4G, 5G (e.g., as defined by 3GPP) technologies or similar technologies. The edge devices 105A-E can by any type or combination of electronic devices that provide computing resources at or in combination with access points such as a base station in a radio access network (RAN) of the mobile network 100. The edge devices 105A-E, base stations, and RAN can enable wireless connections with any number of UE (not shown) that use the services of the mobile network 100.

Similarly, the core network 101 can be any combination and number of electronic devices that enable communication between edge devices and external network (not shown) including networking devices, computing devices, communication links of any type and number and similar components. In some embodiments a cloud platform 103 can be in communication with the core network 101 either as an internal or external aspect of the core network 101. In some embodiments, the cloud platform 103 can be external to the mobile network 100. The cloud platform 103 is a managed set of distributed computing resources that are utilized by the mobile network operators to provide services and functionality to the users of the mobile network 100. The cloud platform 103 can be composed of electronic devices in a data center, distributed across locations or similarly organized.

The mobile network 100 implements the embodiments by use of a set of collaboration clients 117A-E that are executed at or in proximity to the edge devices 105A-E to perform the functions further described herein below to identify and extract the information related to an associated cell that is to be provided to a collaboration server 115. The collaboration server 115 can be executed at the cloud platform 103, distributed in the core network 101 or across edge devices 105A-E or similarly executed. The functions of the collaboration clients 117A-E and collaboration server 115 are illustrated as discrete software components for sake of illustration, however, one skilled in the art would appreciate that the functions of the collaboration clients 117A-E and collaboration server 115 can be differently organized and distributed across the mobile network (e.g., using network function virtualization (NFV), software defined networking (SDN) functionality or similar technologies).

Figure 2:
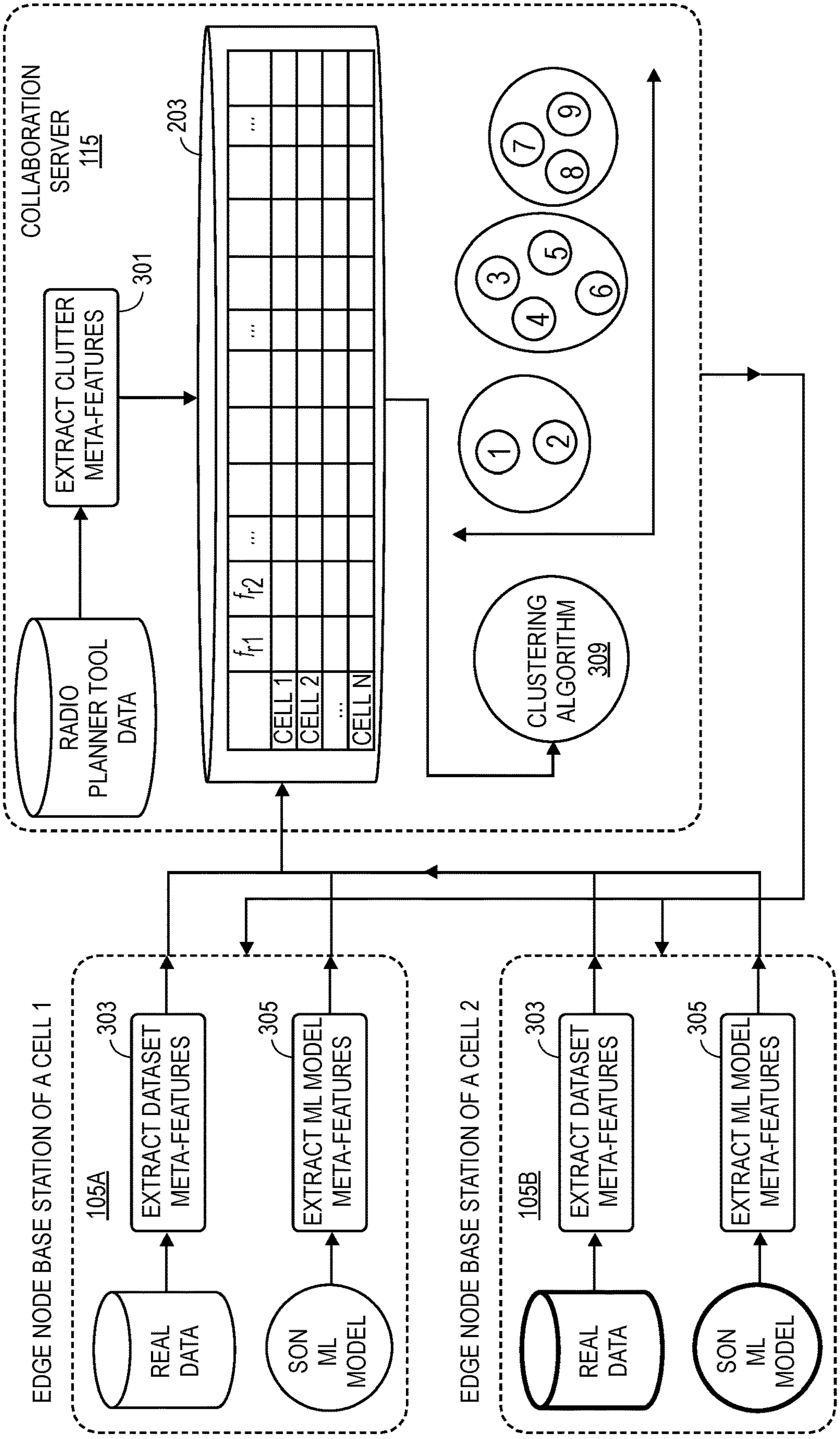
FIG. 2 is a diagram of one embodiment of the components of the collaboration server and collaboration client(s) in the cloud computing platform and edge node(s), respectively.

FIG. 2 is a diagram of one embodiment of the components of the collaboration server and collaboration client(s) in the cloud computing platform and edge node(s), respectively. These components are further discussed herein with relation to the process illustrated in FIG. 3. The functions and data structures of the example base stations 105A and 105B are shown along with the functions and data structures of the collaboration server 115.

The operations in the flow diagrams will be described with reference to the exemplary embodiments of the other figures. However, it should be understood that the operations of the flow diagrams can be performed by embodiments of the invention other than those discussed with reference to the other figures, and the embodiments of the invention discussed with reference to these other figures can perform operations different than those discussed with reference to the flow diagrams. The general flow of data is shown between the functions. The operation of these functions is described with relation to the overall process in FIG. 3.

Figure 3:
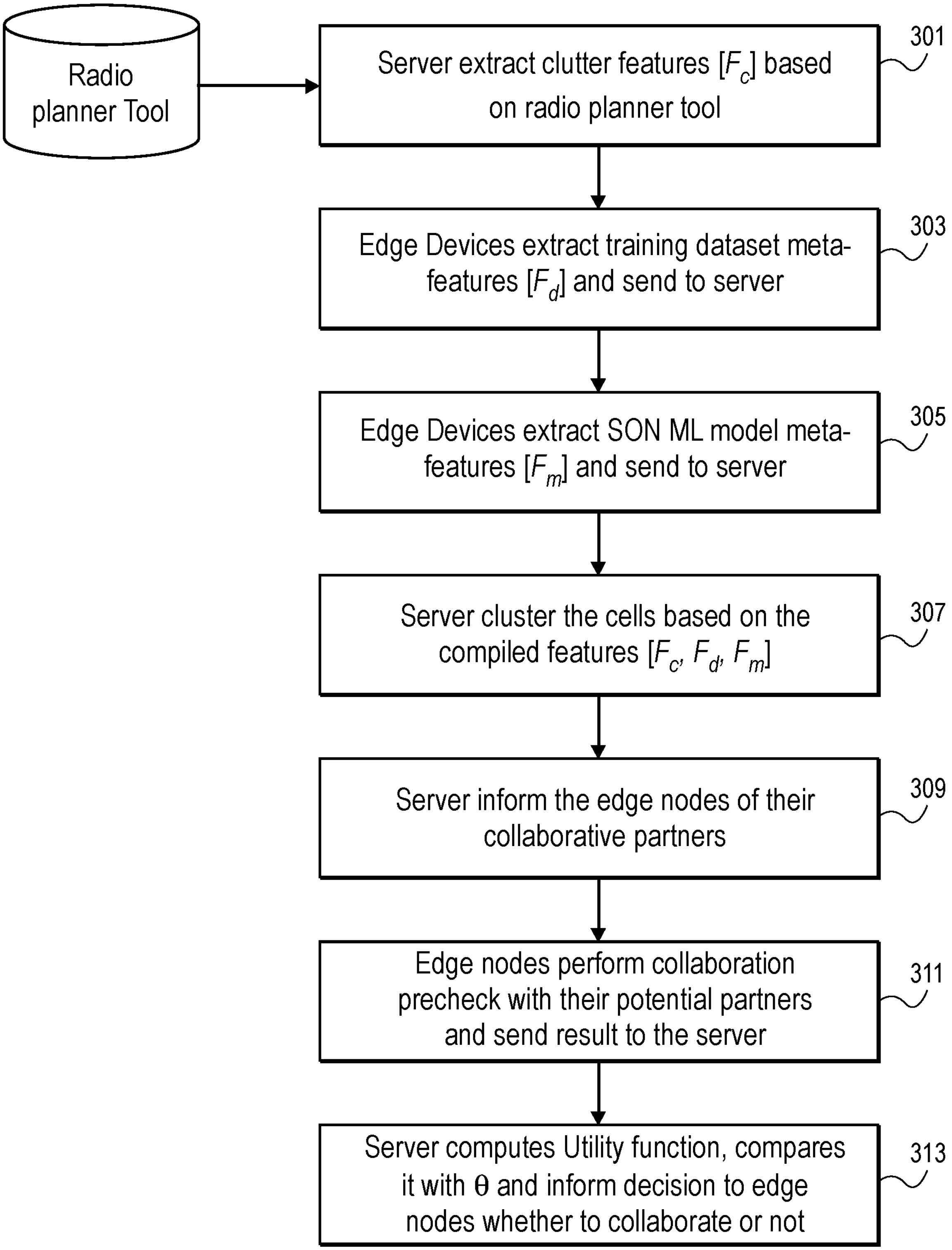
FIG. 3 is a flowchart of one embodiment of a collaboration process.

FIG. 3 is a flowchart of one embodiment of a collaboration process. The collaboration process is implemented by the collaboration server in combination with collaboration clients. The process can rely on information provided by a radio planning tool or similar information source. The process can begin by extracting features based on the information of the radio planning tool (Block 301). The objective of the feature extraction is to identify cells with similar propagation settings like clutter distribution. Intuitively, for ML driven SON use cases like tilt optimization, when two cells have exactly same radio propagation and uniform user density, optimal tilts should be similar (assuming all other factors like interference from neighboring cells are the same). Similarly, for SCP use case, for two cells having similar radio propagation characteristics, an ML model that predicts signal quality on a higher carrier based on signal quality on a lower carrier will be similar in the two cells. Therefore, when a network is planned using a radio planning tool, the planner tool captures the geographical information of the propagation environment using three types of geographical datasets: Digital Terrain Model, Digital Height Model and Digital Land Use Map. These datasets are in a raster grid format, which means that the whole observation area is divided into grids (or bins), each grid containing a specific value for clutter type e.g., open land, rural, urban building, vegetation, park, or similar type. From the clutter information available of the simulation area in the planner tool, the process can find the clutter distribution in the coverage area of all the cells in the network.

If there are i clutter types ($C_1$ to $C_i$), then the process can identify in each cell how much the percentage contribution of each clutter type is e.g., Cell X=$F_{c1}$(High Rise building): 2%, $F_{c2}$(Park): 4%, $Fe_3$(Open land): 10%, . . . , $F_{ci}$(Water): 50%

Then clutter feature vector for this cell x becomes:

$$F_c=[2\%,4\%,10\%, \ldots ,50\%]$$

The collaboration server executes this computation for all the cells in the mobile network or that are in communication with the collaboration server via collaboration clients. When the mobile network is operational then the clutter information for only those grids can be considered which map to location of active subscribers in the network. This information and other information that is collected can be organized in an aggregation structure 203. The aggregation structure 203 can have any size or format. The aggregation structure 203 can be a unitary data structure or can be a set of inter-related data structures.

The process can then continue by extracting features based on training data-set meta-features (Block 303). The extraction of the training data-set meta-features can be implemented at the collaboration client using real data (e.g., any type of metric collected by the edge device). The extraction of the training data-set meta-features is based on the notion that if training datasets distributed at different cells have the same distribution then same class of SON ML models trained on those datasets can collaborate with one another. Therefore, the step involves extracting meta-features of the training data based on which similar cells can be grouped into clusters. These meta-features can be statistical meta-features like standard deviation, variation coefficient, correlation coefficient, skewness, kurtosis, and similar data or information theoretic meta-features like normalized class entropy, normalized, attribute entropy, joint entropy, mutual information and similar data. The features can also be derived based on latent layer in autoencoders fitted on such datasets. e.g., if there are j dataset meta-features for the training dataset of a cell x i.e., Cell X=$F_{d1}$(kurtosis): 0.2, $F_{d2}$(variation coefficient): 5, $F_{dj}$(class entropy): 0.10 then feature vector for cell x becomes:

$$F_d=[0.2,5, \ldots ,0.1]$$

All the edge base stations or collaboration clients 105A and 105B will compute their respective feature vector and send it to the collaboration server 115 (e.g., in the cloud).

The process continues by extracting features based on trained ML models (Block 305). In this step, features of SON ML model (i.e., model hyper-parameters) trained on the dataset of a cell are extracted to be used to find similar cells. The reason model hyper-parameters are utilized is that each classifier in the model synthesizes the training data and therefore every model description can be used to describe the training dataset e.g., a decision tree generated based on training data can be regarded as a model of the training data. For decision trees hyper-parameters extracted can include a number of leaves, tree height, width, maximum number of leaves matching to a same class, and similar hyper-parameters. For neural networks, hyper-parameters extracted can include a measure of the weights or activation functions. Similarly, for a k-nearest neighbor (KNN) algorithm, features like a number of neighbors can be considered.

For example, if there are k SON ML model meta-features of a cell i.e., $$\text{Cell } X=F_{m1}(\text{num. of leaves}):5, F_{m2}(\text{tree height}):100, \ldots, F_{mk}(\text{tree width}):7$$

then the model hyper-parameter feature vector for cell x will be:

$$F_m=[5,100, \ldots ,7]$$

Thus, the model hyper-parameter features that are extracted are dependent on the ML model type. All the collaboration clients or similar functions at the edge base stations will compute their respective model hyper-parameter feature vector and send it to the collaboration server (e.g., in the cloud).

The collaboration server receives these feature vectors from each collaboration client and utilizes the information for determining clustering. The collaboration server takes the compiled features [$F_c$, $F_d$, $F_m$] from all the cells and aggregates them in the form of training dataset as an aggregate structure. One example of an aggregate structure is shown below.

TABLE I

| | $F_{c1}$ | $F_{c2}$ | . . . | $F_{ci}$ | $F_{d1}$ | $F_{d2}$ | . . . | $F_{dj}$ | $F_{m1}$ | $F_{m2}$ | . . . | $F_{mk}$ |
|---|---|---|---|---|---|---|---|---|---|---|---|---|
| Cell 1 | . . . | . . . | . . . | . . . | . . . | . . . | . . . | . . . | . . . | . . . | . . . | . . . |
| Cell 2 | . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . | . . . |
| Cell n | . . . | . . . | . . . | . . . | . . . | . . . | . . . | . . . | . . . | . . . | . . . | . . . |

This dataset is then used by the collaboration server to cluster SON ML models and associated cells such that similar cells with the best synergy to collaborate are selected to belong to same cluster. Any clustering algorithm (e.g., a K-Means algorithm) can be used to cluster the dataset as shown in Table I, wherein the input to the clustering algorithm will be columns of Table I and clustering performance metrics like Silhouette Coefficient can be utilized to assess performance of the clustering algorithm. In some embodiments, additional features like cell configuration parameters including tilts, carrier frequency, transmission power, and similar parameters and key performance indicators (KPIs) such as load utilization of cells, measures of mobility trends like hand-off related KPIs and similar features can also be used as additional features for clustering criterion depending upon specific SON use cases, e.g., cell load utilization for load balancing, handover (HO) reports for mobility robustness optimization, power consumption of base stations for energy saving, and similar cases.

Once the clusters of edge nodes/collaboration clients are identified, then the collaboration server sends collaboration information to the edge nodes that identifies the members of the collaborative cells (Block 309). Based on the clusters identified, the collaboration server can inform the edge nodes and collaboration clients in the cells belonging to a cluster about their potential collaborative partners with which they can collaborate via any type of notification, message, or similar mechanism. The collaboration information can provide any information about each of the cluster members to enable each member to communicate with the other cluster members to complete the process such as performing a collaboration pre-check.

A collaboration pre-check can be performed by respective collaboration clients for each possible node pair in a cluster (Block 311), where any two potential candidate cells take part in collaborating pre-check process. The pre-check process involves a first cell with some labeled dataset X1 sending the dataset to a second cell having a trained model M2. Similarly, the second cell sends its labeled data X2 to first cell having trained model M1. After receiving the respective data sets and running them via their model, both candidate collaborative cells send the resulting performance related metrics (P) like accuracy, receiver operating characteristic curve (ROC) or area under ROC (AUC), F1 score, and similar information to the collaboration server.

Figure 4:
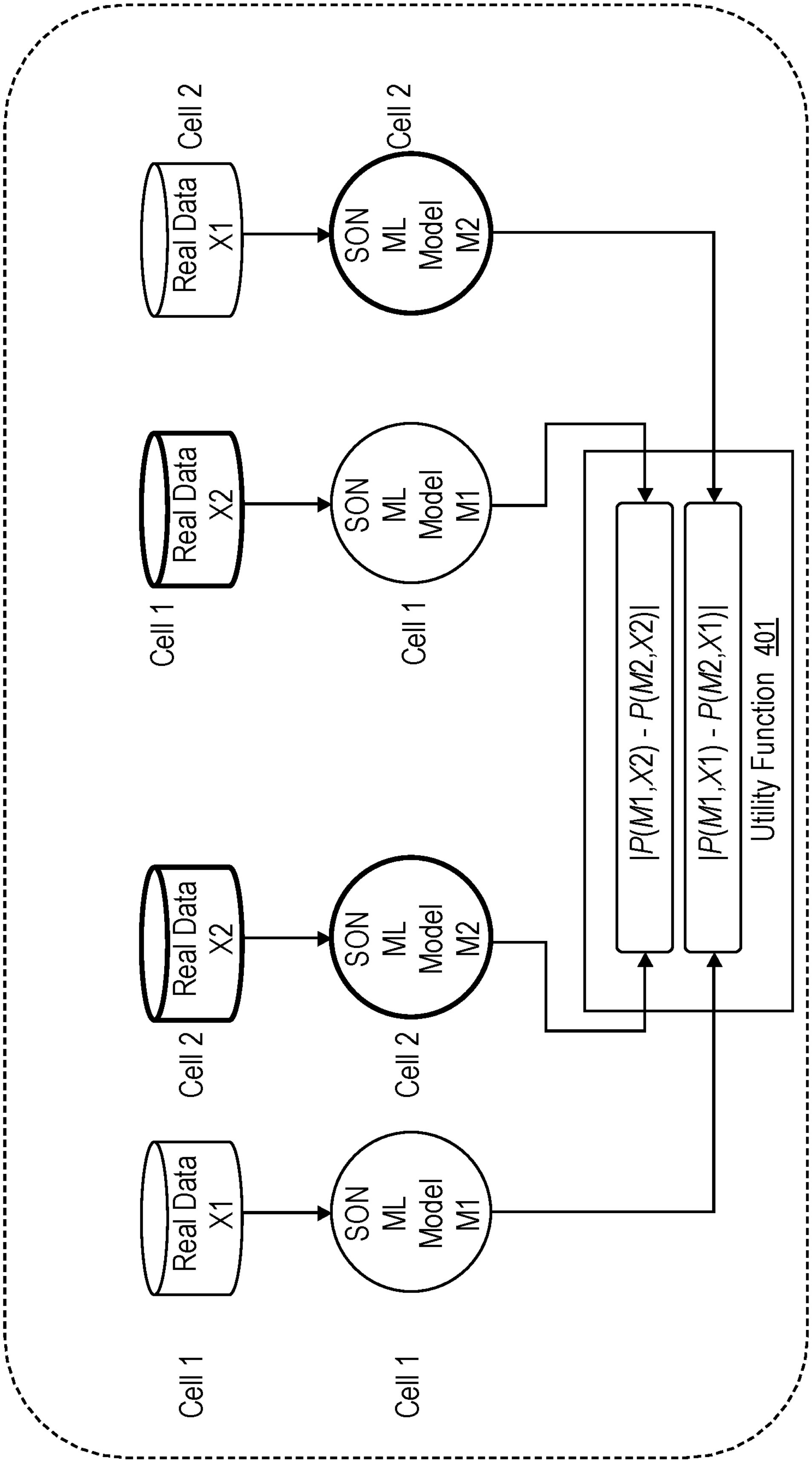
FIG. 4 is a diagram of one embodiment of the utility function.

The collaboration server compiles the pre-check results and utilizes them to determine whether the edge nodes are to collaborate with their cluster partners or not (Block 313). In this step, as further described in relation to FIG. 4, based on the pre-check results received from the collaboration clients from any two potential collaborative partner cells (e.g., cell 1 and cell 2 in the illustrated example of FIG. 4), the collaboration server computes a utility function 401 as:

$$U=\lambda_1[|P(M1,X1)-P(M2,X1)|+|P(M1,X2)-P(M2,X2)|]+\lambda_2 C(X1,X2,M1,M2,N) \quad (1)$$

where C is the cost of collaboration that can be quantified in terms of a signaling load generated due to transport network utilization to carry model parameters and datasets between collaborating cells and where the collaboration server has access to network performance metrics to quantify C. The coefficients $\lambda$, and $\lambda_2$ sets priority for transfer learning associated costs while N is the current network statistics including bandwidth of all links in the network that will carry transfer learning related signaling load. In this function, P is a performance metric (e.g., Accuracy, AUC, F1, or similar metric) and will depend upon the ML model trained and data used for validation. For example, P(M1,X1) means performance achieved when trained model M1 of cell 1 is tested with data X1 of cell 1, while P(M2,X1) means performance achieved when model M2 of cell 2 is tested with data X1 of cell 1.

The collaboration server then compares U with a predefined threshold $\Theta$. If $U<\Theta$ then the two models/nodes/collaboration clients are permitted to transfer knowledge and collaborate for instance by sharing their complete datasets or using techniques like knowledge distillation. Any method can be employed to choose $\Theta$. This threshold can be set based on specific use case and operator policies. Higher values will encourage more collaboration, but it can also lead to negative transfer or higher signaling cost. On the other hand, smaller values of $\Theta$ will encourage very few cells but with high probability of fruitful potential collaboration.

In another embodiment, clustering or some similarity scores of the collaborating models can also be shared by the collaboration server, i.e., for a given cell 1, compared to cells 2 to 10 that fall in same cluster as that of cell 1, rank them on basis of similarity score compared to cell 1. Human domain knowledge can also be utilized for this clustering decision, i.e., to change cluster membership of cells based on expert knowledge, e.g., a radio frequency (RF) expert can cluster two 5G small cells in same cluster if both are using very deep neural networks or under similar circumstances. The human expert knowledge can also change threshold "$\Theta$" or cost function 'C' in the equation by adding bias to it based on his/her experience.

It is to be noted that Bayesian ensemble methods that are utilized in machine learning to detect data drift detection can also be leveraged to compare similarity between models of cells based on their datasets. The training dataset extract of features can use data features to compare similarity as well. But the clutter feature extraction adds another layer based on radio propagation clutter settings that will make similarity detection more accurate when complemented with the other extraction steps and allows incorporation of domain knowledge by defining clutter features. Another reason is that for cells with different number of features (e.g., number of neighboring sites based on carrier frequency may be different and in those cases a comparison based on just datasets features will not be accurate) and actual cell radio propagation clutter features than need to be incorporated in similarity computation decisions as well as has been done in clutter feature extraction.

Figure 5:
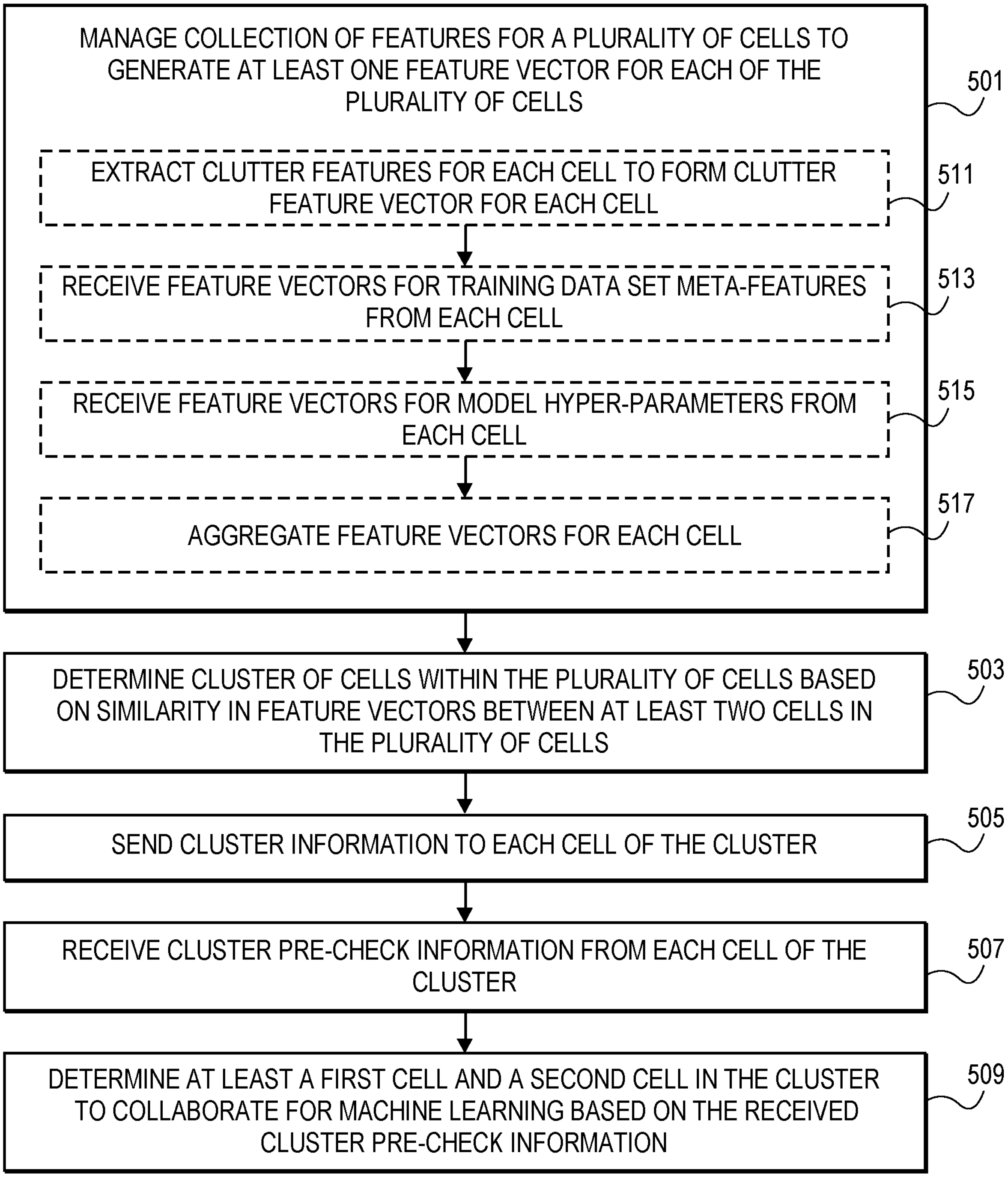
FIG. 5 is a diagram of one embodiment of the collaboration server process.

FIG. 5 is a diagram of one embodiment of the collaboration server process. The collaboration process as described herein is further detailed in an example implementation of a collaboration server process. The collaboration server can initiate the overall collaboration process by managing collection of features for a plurality of cells (i.e., collaboration client/edge nodes) to generate at least one feature vector for each of the plurality of cells (Block 501). In some embodiments, the extraction of features can encompass any one or more of clutter features, training data meta-features, model hyper-parameters, and similar features.

In some embodiments, the collaboration server extracts clutter features for each cell in the mobile network from data of a radio planning tool or similar source to form a clutter feature vector for each cell. The clutter feature vector includes classification of the characteristics of a region of each cell. The collaboration server receives feature vectors for training data set meta-features from the collaboration clients of each cell (Block 513), feature vectors for model hyper-parameters from the collaboration client of each cell (Block 515), and similar feature vector information. The collected feature vector information is aggregated into an aggregation structure (Block 517).

Once the feature vector information is aggregated, the collaboration server can determine how to cluster the cells of the mobile network based on similarities in the feature vectors between the cells in the aggregation structure (Block 503). The identification of similarities can use any comparison algorithm, distance determination mechanism, scoring scheme, or other process to identify similarities. The cluster information that identifies the members of a cluster is then sent to each of the cells of the respective cluster (Block 505). This enables each of the cells of an identified cluster to communicate with one another to perform a pre-check. The collaboration clients then perform pairwise pre-checks and return the results of the pre-check to the collaboration server (Block 507). The pre-check results can then be analyzed (e.g., against a threshold level) to confirm that each pair of cells can efficiently collaborate (Block 509). In some embodiments, additional iterations of these steps can be carried out to find additional candidates for clusters or to re-cluster some or all nodes where an insufficient number of collaborators are found for any number of the cells.

Figure 6:
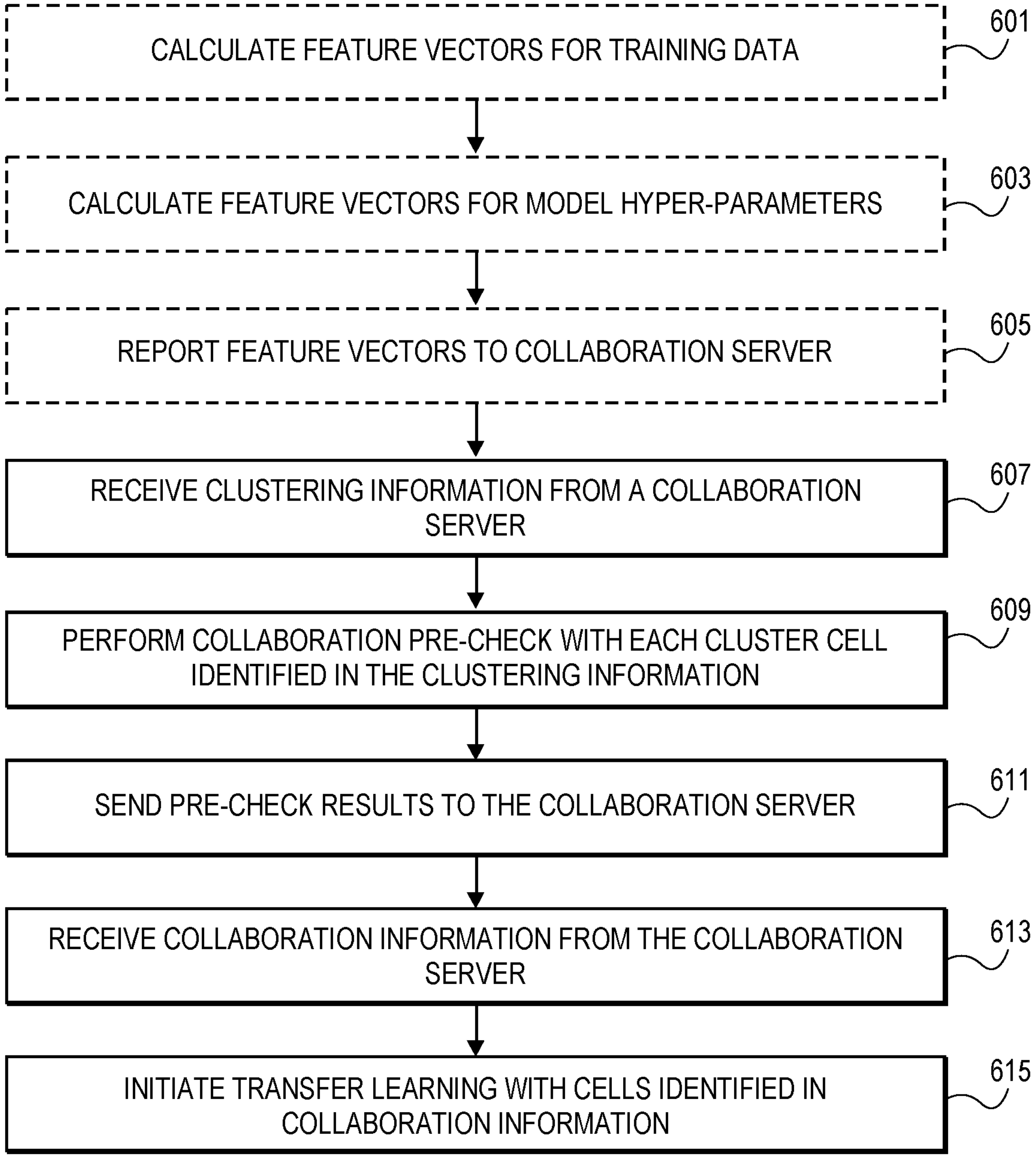
FIG. 6 is a flowchart of one embodiment of the collaboration client process.

FIG. 6 is a flowchart of one embodiment of the collaboration client process. The process is an example of a process implemented by each of the collaboration clients in a mobile network. In some embodiments, the collaboration clients can calculate the feature vectors specific to the associated cell, which is then provided to the collaboration server. In other embodiments, this collection process can be implemented separately from the other processes. The feature vectors can be computed in any order or with any timing. In some embodiments, these feature vectors can be periodically updated. The calculation of the feature vectors includes computing a feature vector for the training data set (Block 601) and for the model hyper-parameters of the cell (Block 603). The computed feature vectors are then sent to the collaboration server (Block 605). Any protocol or data transfer method can be utilized to provide the feature vectors to the collaboration server.

The collaboration client receives clustering information from the collaboration server (Block 607). As detailed above, this clustering information is based on similarities in the feature vectors and the clustering information identifies each of the members of a cluster to enable the members to perform pairwise pre-check processes. The collaboration client identifies each of the other members of its assigned cluster and exchange training data and similar information. The exchanged information is then applied to the local model and the metrics for this information are captured (Block 609). In addition, the metrics related to the exchange of the information (e.g., timing, throughput, and similar metrics) are captured. The collected results of the pre-check are then provided to the collaboration server (Block 611).

The collaboration client receives collaboration information from the collaboration server (Block 613). The collaboration information indicates which of the other cluster member that the client application is to collaborate with actively. The collaboration client then establishes transfer learning or similar exchange of collected real-time data, training data, or similar information to enhance the operation of the respective ML models utilized by each cell associated with the collaboration clients.

FIG. 7A illustrates connectivity between network devices (NDs) within an exemplary network, as well as three exemplary implementations of the NDs, according to some embodiments of the invention. FIG. 7A shows NDs 700A-H, and their connectivity by way of lines between 700A-700B, 700B-700C, 700C-700D, 700D-700E, 700E-700F, 700F-700G, and 700A-700G, as well as between 700H and each of 700A, 700C, 700D, and 700G. These NDs are physical devices, and the connectivity between these NDs can be wireless or wired (often referred to as a link). An additional line extending from NDs 700A, 700E, and 700F illustrates that these NDs act as ingress and egress points for the network (and thus, these NDs are sometimes referred to as edge NDs; while the other NDs may be called core NDs).

Two of the exemplary ND implementations in FIG. 7A are: 1) a special-purpose network device 702 that uses custom application-specific integrated-circuits (ASICs) and a special-purpose operating system (OS); and 2) a general purpose network device 704 that uses common off-the-shelf (COTS) processors and a standard OS.

The special-purpose network device 702 includes networking hardware 710 comprising a set of one or more processor(s) 712, forwarding resource(s) 714 (which typically include one or more ASICs and/or network processors), and physical network interfaces (NIs) 716 (through which network connections are made, such as those shown by the connectivity between NDs 700A-H), as well as non-transitory machine readable storage media 718 having stored therein networking software 720. During operation, the networking software 720 may be executed by the networking hardware 710 to instantiate a set of one or more networking software instance(s) 722. Each of the networking software instance(s) 722, and that part of the networking hardware 710 that executes that network software instance (be it hardware dedicated to that networking software instance and/or time slices of hardware temporally shared by that networking software instance with others of the networking software instance(s) 722), form a separate virtual network element 730A-R. Each of the virtual network element(s) (VNEs) 730A-R includes a control communication and configuration module 732A-R (sometimes referred to as a local control module or control communication module) and forwarding table(s) 734A-R, such that a given virtual network element (e.g., 730A) includes the control communication and configuration module (e.g., 732A), a set of one or more forwarding table(s) (e.g., 734A), and that portion of the networking hardware 710 that executes the virtual network element (e.g., 730A).

In some embodiments, the collaboration client and/or collaboration server 765 can be stored and loaded from the non-transitory machine readable storage media 718 by processors 712 and other resources of the special purpose network device 702.

The special-purpose network device 702 is often physically and/or logically considered to include: 1) a ND control plane 724 (sometimes referred to as a control plane) comprising the processor(s) 712 that execute the control communication and configuration module(s) 732A-R; and 2) a ND forwarding plane 726 (sometimes referred to as a forwarding plane, a data plane, or a media plane) comprising the forwarding resource(s) 714 that utilize the forwarding table(s) 734A-R and the physical NIs 716. By way of example, where the ND is a router (or is implementing routing functionality), the ND control plane 724 (the processor(s) 712 executing the control communication and configuration module(s) 732A-R) is typically responsible for participating in controlling how data (e.g., packets) is to be routed (e.g., the next hop for the data and the outgoing physical NI for that data) and storing that routing information in the forwarding table(s) 734A-R, and the ND forwarding plane 726 is responsible for receiving that data on the physical NIs 716 and forwarding that data out the appropriate ones of the physical NIs 716 based on the forwarding table(s) 734A-R.

FIG. 7B illustrates an exemplary way to implement the special-purpose network device 702 according to some embodiments of the invention. FIG. 7B shows a special-purpose network device including cards 738 (typically hot pluggable). While in some embodiments the cards 738 are of two types (one or more that operate as the ND forwarding plane 726 (sometimes called line cards), and one or more that operate to implement the ND control plane 724 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VoIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 736 (e.g., a first full mesh coupling the line cards and a second full mesh coupling all of the cards).

Returning to FIG. 7A, the general purpose network device 704 includes hardware 740 comprising a set of one or more processor(s) 742 (which are often COTS processors) and physical NIs 746, as well as non-transitory machine readable storage media 748 having stored therein software 750. During operation, the processor(s) 742 execute the software 750 to instantiate one or more sets of one or more applications 764A-R. While one embodiment does not implement virtualization, alternative embodiments may use different forms of virtualization. For example, in one such alternative embodiment the virtualization layer 754 represents the kernel of an operating system (or a shim executing on a base operating system) that allows for the creation of multiple instances 762A-R called software containers that may each be used to execute one (or more) of the sets of applications 764A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 754 represents a hypervisor (sometimes referred to as a virtual machine monitor (VMM)) or a hypervisor executing on top of a host operating system, and each of the sets of applications 764A-R is run on top of a guest operating system within an instance 762A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 740, directly on a hypervisor (in which case the unikernel is sometimes described as running within a LibOS virtual machine), or in a software container, embodiments can be implemented fully with unikernels running directly on a hypervisor represented by virtualization layer 754, unikernels running within software containers represented by instances 762A-R, or as a combination of unikernels and the above-described techniques (e.g., unikernels and virtual machines both run directly on a hypervisor, unikernels and sets of applications that are run in different software containers).

In some embodiments, the collaboration client and/or collaboration server 765 can be stored and loaded from the non-transitory machine readable storage media 748 by processors 742 and other resources of the general purpose network device 704.

The instantiation of the one or more sets of one or more applications 764A-R, as well as virtualization if implemented, are collectively referred to as software instance(s) 752. Each set of applications 764A-R, corresponding virtualization construct (e.g., instance 762A-R) if implemented, and that part of the hardware 740 that executes them (be it hardware dedicated to that execution and/or time slices of hardware temporally shared), forms a separate virtual network element(s) 760A-R.

The virtual network element(s) 760A-R perform similar functionality to the virtual network element(s) 730A-R—e.g., similar to the control communication and configuration module(s) 732A and forwarding table(s) 734A (this virtualization of the hardware 740 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 762A-R corresponding to one VNE 760A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 762A-R to VNEs also apply to embodiments where such a finer level of granularity and/or unikernels are used.

In certain embodiments, the virtualization layer 754 includes a virtual switch that provides similar forwarding services as a physical Ethernet switch. Specifically, this virtual switch forwards traffic between instances 762A-R and the physical NI(s) 746, as well as optionally between the instances 762A-R; in addition, this virtual switch may enforce network isolation between the VNEs 760A-R that by policy are not permitted to communicate with each other (e.g., by honoring virtual local area networks (VLANs)).

The third exemplary ND implementation in FIG. 7A is a hybrid network device 706, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 702) could provide for para-virtualization to the networking hardware present in the hybrid network device 706.

Regardless of the above exemplary implementations of an ND, when a single one of multiple VNEs implemented by an ND is being considered (e.g., only one of the VNEs is part of a given virtual network) or where only a single VNE is currently being implemented by an ND, the shortened term network element (NE) is sometimes used to refer to that VNE. Also in all of the above exemplary implementations, each of the VNEs (e.g., VNE(s) 730A-R, VNEs 760A-R, and those in the hybrid network device 706) receives data on the physical NIs (e.g., 716, 746) and forwards that data out the appropriate ones of the physical NIs (e.g., 716, 746). For example, a VNE implementing IP router functionality forwards IP packets on the basis of some of the IP header information in the IP packet; where IP header information includes source IP address, destination IP address, source port, destination port (where "source port" and "destination port" refer herein to protocol ports, as opposed to physical ports of a ND), transport protocol (e.g., user datagram protocol (UDP), Transmission Control Protocol (TCP), and differentiated services code point (DSCP) values.

Figure 7C:
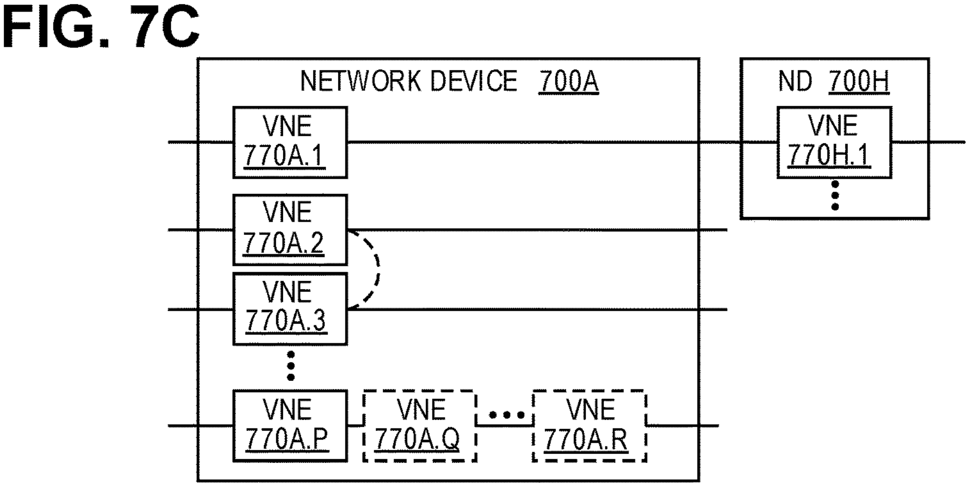
FIG. 7C illustrates various exemplary ways in which virtual network elements (VNEs) may be coupled according to some embodiments of the invention.

FIG. 7C illustrates various exemplary ways in which VNEs may be coupled according to some embodiments of the invention. FIG. 7C shows VNEs 770A.1-770A.P (and optionally VNEs 770A.Q-770A.R) implemented in ND 700A and VNE 770H.1 in ND 700H. In FIG. 7C, VNEs 770A.1-P are separate from each other in the sense that they can receive packets from outside ND 700A and forward packets outside of ND 700A; VNE 770A.1 is coupled with VNE 770H.1, and thus they communicate packets between their respective NDs; VNE 770A.2-770A.3 may optionally forward packets between themselves without forwarding them outside of the ND 700A; and VNE 770A.P may optionally be the first in a chain of VNEs that includes VNE 770A.Q followed by VNE 770A.R (this is sometimes referred to as dynamic service chaining, where each of the VNEs in the series of VNEs provides a different service—e.g., one or more layer 4-7 network services). While FIG. 7C illustrates various exemplary relationships between the VNEs, alternative embodiments may support other relationships (e.g., more/fewer VNEs, more/fewer dynamic service chains, multiple different dynamic service chains with some common VNEs and some different VNEs).

The NDs of FIG. 7A, for example, may form part of the Internet or a private network; and other electronic devices (not shown; such as end user devices including workstations, laptops, netbooks, tablets, palm tops, mobile phones, smartphones, phablets, multimedia phones, Voice Over Internet Protocol (VOIP) phones, terminals, portable media players, GPS units, wearable devices, gaming systems, set-top boxes, Internet enabled household appliances) may be coupled to the network (directly or through other networks such as access networks) to communicate over the network (e.g., the Internet or virtual private networks (VPNs) overlaid on (e.g., tunneled through) the Internet) with each other (directly or through servers) and/or access content and/or services. Such content and/or services are typically provided by one or more servers (not shown) belonging to a service/content provider or one or more end user devices (not shown) participating in a peer-to-peer (P2P) service, and may include, for example, public webpages (e.g., free content, store fronts, search services), private webpages (e.g., username/password accessed webpages providing email services), and/or corporate networks over VPNs. For instance, end user devices may be coupled (e.g., through customer premise equipment coupled to an access network (wired or wirelessly)) to edge NDs, which are coupled (e.g., through one or more core NDs) to other edge NDs, which are coupled to electronic devices acting as servers. However, through compute and storage virtualization, one or more of the electronic devices operating as the NDs in FIG. 7A may also host one or more such servers (e.g., in the case of the general purpose network device 704, one or more of the software instances 762A-R may operate as servers; the same would be true for the hybrid network device 706; in the case of the special-purpose network device 702, one or more such servers could also be run on a virtualization layer executed by the processor(s) 712); in which case the servers are said to be co-located with the VNEs of that ND.

A virtual network is a logical abstraction of a physical network (such as that in FIG. 7A) that provides network services (e.g., L2 and/or L3 services). A virtual network can be implemented as an overlay network (sometimes referred to as a network virtualization overlay) that provides network services (e.g., layer 2 (L2, data link layer) and/or layer 3 (L3, network layer) services) over an underlay network (e.g., an L3 network, such as an Internet Protocol (IP) network that uses tunnels (e.g., generic routing encapsulation (GRE), layer 2 tunneling protocol (L2TP), IPSec) to create the overlay network).

A network virtualization edge (NVE) sits at the edge of the underlay network and participates in implementing the network virtualization; the network-facing side of the NVE uses the underlay network to tunnel frames to and from other NVEs; the outward-facing side of the NVE sends and receives data to and from systems outside the network. A virtual network instance (VNI) is a specific instance of a virtual network on a NVE (e.g., a NE/VNE on an ND, a part of a NE/VNE on a ND where that NE/VNE is divided into multiple VNEs through emulation); one or more VNIs can be instantiated on an NVE (e.g., as different VNEs on an ND). A virtual access point (VAP) is a logical connection point on the NVE for connecting external systems to a virtual network; a VAP can be physical or virtual ports identified through logical interface identifiers (e.g., a VLAN ID).

Examples of network services include: 1) an Ethernet LAN emulation service (an Ethernet-based multipoint service similar to an Internet Engineering Task Force (IETF) Multiprotocol Label Switching (MPLS) or Ethernet VPN (EVPN) service) in which external systems are interconnected across the network by a LAN environment over the underlay network (e.g., an NVE provides separate L2 VNIs (virtual switching instances) for different such virtual networks, and L3 (e.g., IP/MPLS) tunneling encapsulation across the underlay network); and 2) a virtualized IP forwarding service (similar to IETF IP VPN (e.g., Border Gateway Protocol (BGP)/MPLS IPVPN) from a service definition perspective) in which external systems are interconnected across the network by an L3 environment over the underlay network (e.g., an NVE provides separate L3 VNIs (forwarding and routing instances) for different such virtual networks, and L3 (e.g., IP/MPLS) tunneling encapsulation across the underlay network)). Network services may also include quality of service capabilities (e.g., traffic classification marking, traffic conditioning and scheduling), security capabilities (e.g., filters to protect customer premises from network—originated attacks, to avoid malformed route announcements), and management capabilities (e.g., full detection and processing).

Figure 7D:
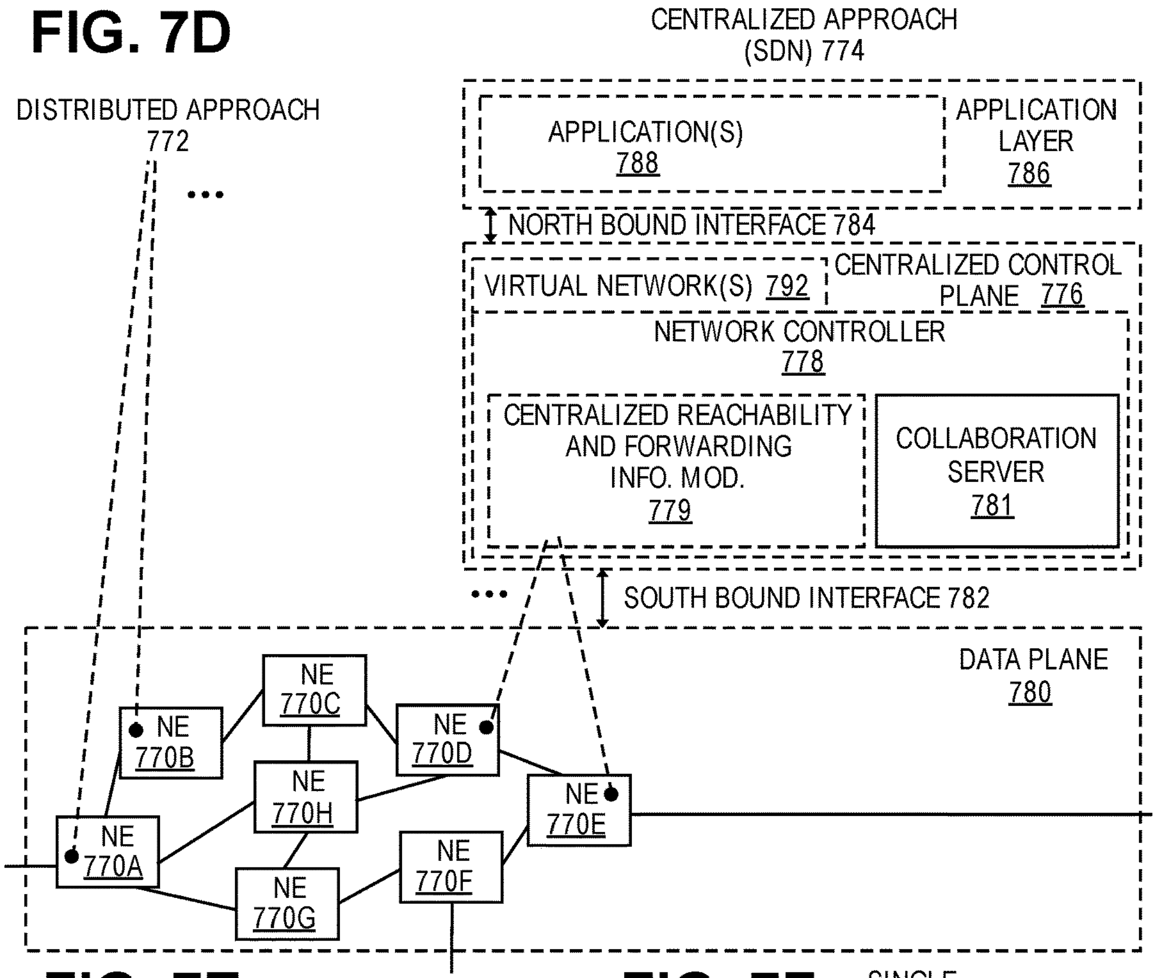
FIG. 7D illustrates a network with a single network element (NE) on each of the NDs, and within this straight forward approach contrasts a traditional distributed approach (commonly used by traditional routers) with a centralized approach for maintaining reachability and forwarding information (also called network control), according to some embodiments of the invention.

FIG. 7D illustrates a network with a single network element on each of the NDs of FIG. 7A, and within this straight forward approach contrasts a traditional distributed approach (commonly used by traditional routers) with a centralized approach for maintaining reachability and forwarding information (also called network control), according to some embodiments of the invention. Specifically, FIG. 7D illustrates network elements (NEs) 770A-H with the same connectivity as the NDs 700A-H of FIG. 7A.

FIG. 7D illustrates that the distributed approach 772 distributes responsibility for generating the reachability and forwarding information across the NEs 770A-H; in other words, the process of neighbor discovery and topology discovery is distributed.

For example, where the special-purpose network device 702 is used, the control communication and configuration module(s) 732A-R of the ND control plane 724 typically include a reachability and forwarding information module to implement one or more routing protocols (e.g., an exterior gateway protocol such as Border Gateway Protocol (BGP), Interior Gateway Protocol(s) (IGP) (e.g., Open Shortest Path First (OSPF), Intermediate System to Intermediate System (IS-IS), Routing Information Protocol (RIP), Label Distribution Protocol (LDP), Resource Reservation Protocol (RSVP) (including RSVP-Traffic Engineering (TE): Extensions to RSVP for LSP Tunnels and Generalized Multi-Protocol Label Switching (GMPLS) Signaling RSVP-TE))

that communicate with other NEs to exchange routes, and then selects those routes based on one or more routing metrics. Thus, the NEs 770A-H (e.g., the processor(s) 712 executing the control communication and configuration module(s) 732A-R) perform their responsibility for participating in controlling how data (e.g., packets) is to be routed (e.g., the next hop for the data and the outgoing physical NI for that data) by distributively determining the reachability within the network and calculating their respective forwarding information. Routes and adjacencies are stored in one or more routing structures (e.g., Routing Information Base (RIB), Label Information Base (LIB), one or more adjacency structures) on the ND control plane 724. The ND control plane 724 programs the ND forwarding plane 726 with information (e.g., adjacency and route information) based on the routing structure(s). For example, the ND control plane 724 programs the adjacency and route information into one or more forwarding table(s) 734A-R (e.g., Forwarding Information Base (FIB), Label Forwarding Information Base (LFIB), and one or more adjacency structures) on the ND forwarding plane 726. For layer 2 forwarding, the ND can store one or more bridging tables that are used to forward data based on the layer 2 information in that data. While the above example uses the special-purpose network device 702, the same distributed approach 772 can be implemented on the general purpose network device 704 and the hybrid network device 706.

FIG. 7D illustrates that a centralized approach 774 (also known as software defined networking (SDN)) that decouples the system that makes decisions about where traffic is sent from the underlying systems that forwards traffic to the selected destination. The illustrated centralized approach 774 has the responsibility for the generation of reachability and forwarding information in a centralized control plane 776 (sometimes referred to as a SDN control module, controller, network controller, OpenFlow controller, SDN controller, control plane node, network virtualization authority, or management control entity), and thus the process of neighbor discovery and topology discovery is centralized. The centralized control plane 776 has a south bound interface 782 with a data plane 780 (sometime referred to the infrastructure layer, network forwarding plane, or forwarding plane (which should not be confused with a ND forwarding plane)) that includes the NEs 770A-H (sometimes referred to as switches, forwarding elements, data plane elements, or nodes). The centralized control plane 776 includes a network controller 778, which includes a centralized reachability and forwarding information module 779 that determines the reachability within the network and distributes the forwarding information to the NEs 770A-H of the data plane 780 over the south bound interface 782 (which may use the OpenFlow protocol). Thus, the network intelligence is centralized in the centralized control plane 776 executing on electronic devices that are typically separate from the NDs.

In some embodiments, the collaboration server 781 can be executed as part of the centralized approach 774 such as in the network controller 778 or similar location along with other resources of the centralized approach 774.

For example, where the special-purpose network device 702 is used in the data plane 780, each of the control communication and configuration module(s) 732A-R of the ND control plane 724 typically include a control agent that provides the VNE side of the south bound interface 782. In this case, the ND control plane 724 (the processor(s) 712 executing the control communication and configuration module(s) 732A-R) performs its responsibility for participating in controlling how data (e.g., packets) is to be routed (e.g., the next hop for the data and the outgoing physical NI for that data) through the control agent communicating with the centralized control plane 776 to receive the forwarding information (and in some cases, the reachability information) from the centralized reachability and forwarding information module 779 (it should be understood that in some embodiments of the invention, the control communication and configuration module(s) 732A-R, in addition to communicating with the centralized control plane 776, may also play some role in determining reachability and/or calculating forwarding information—albeit less so than in the case of a distributed approach; such embodiments are generally considered to fall under the centralized approach 774, but may also be considered a hybrid approach).

While the above example uses the special-purpose network device 702, the same centralized approach 774 can be implemented with the general purpose network device 704 (e.g., each of the VNE 760A-R performs its responsibility for controlling how data (e.g., packets) is to be routed (e.g., the next hop for the data and the outgoing physical NI for that data) by communicating with the centralized control plane 776 to receive the forwarding information (and in some cases, the reachability information) from the centralized reachability and forwarding information module 779; it should be understood that in some embodiments of the invention, the VNEs 760A-R, in addition to communicating with the centralized control plane 776, may also play some role in determining reachability and/or calculating forwarding information—albeit less so than in the case of a distributed approach) and the hybrid network device 706. In fact, the use of SDN techniques can enhance the NFV techniques typically used in the general purpose network device 704 or hybrid network device 706 implementations as NFV is able to support SDN by providing an infrastructure upon which the SDN software can be run, and NFV and SDN both aim to make use of commodity server hardware and physical switches.

FIG. 7D also shows that the centralized control plane 776 has a north bound interface 784 to an application layer 786, in which resides application(s) 788. The centralized control plane 776 has the ability to form virtual networks 792 (sometimes referred to as a logical forwarding plane, network services, or overlay networks (with the NEs 770A-H of the data plane 780 being the underlay network)) for the application(s) 788. Thus, the centralized control plane 776 maintains a global view of all NDs and configured NEs/VNEs, and it maps the virtual networks to the underlying NDs efficiently (including maintaining these mappings as the physical network changes either through hardware (ND, link, or ND component) failure, addition, or removal).

While FIG. 7D shows the distributed approach 772 separate from the centralized approach 774, the effort of network control may be distributed differently or the two combined in certain embodiments of the invention. For example: 1) embodiments may generally use the centralized approach (SDN) 774, but have certain functions delegated to the NEs (e.g., the distributed approach may be used to implement one or more of fault monitoring, performance monitoring, protection switching, and primitives for neighbor and/or topology discovery); or 2) embodiments of the invention may perform neighbor discovery and topology discovery via both the centralized control plane and the distributed protocols, and the results compared to raise exceptions where they do not agree. Such embodiments are generally considered to fall under the centralized approach 774, but may also be considered a hybrid approach.

While FIG. 7D illustrates the simple case where each of the NDs 700A-H implements a single NE 770A-H, it should be understood that the network control approaches described with reference to FIG. 7D also work for networks where one or more of the NDs 700A-H implement multiple VNEs (e.g., VNEs 730A-R, VNEs 760A-R, those in the hybrid network device 706). Alternatively or in addition, the network controller 778 may also emulate the implementation of multiple VNEs in a single ND. Specifically, instead of (or in addition to) implementing multiple VNEs in a single ND, the network controller 778 may present the implementation of a VNE/NE in a single ND as multiple VNEs in the virtual networks 792 (all in the same one of the virtual network(s) 792, each in different ones of the virtual network(s) 792, or some combination). For example, the network controller 778 may cause an ND to implement a single VNE (a NE) in the underlay network, and then logically divide up the resources of that NE within the centralized control plane 776 to present different VNEs in the virtual network(s) 792 (where these different VNEs in the overlay networks are sharing the resources of the single VNE/NE implementation on the ND in the underlay network).

Figure 7E:
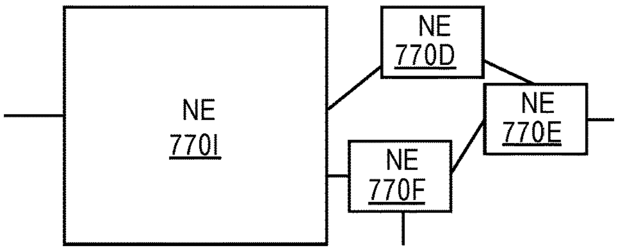
FIG. 7E illustrates the simple case of where each of the NDs implements a single NE, but a centralized control plane has abstracted multiple of the NEs in different NDs into (to represent) a single NE in one of the virtual network(s), according to some embodiments of the invention.
Figure 7F:
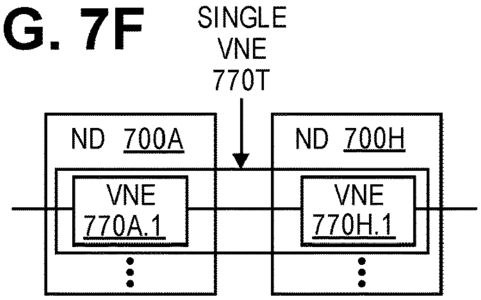
FIG. 7F illustrates a case where multiple VNEs are implemented on different NDs and are coupled to each other, and where a centralized control plane has abstracted these multiple VNEs such that they appear as a single VNE within one of the virtual networks, according to some embodiments of the invention.

On the other hand, FIGS. 7E and 7F respectively illustrate exemplary abstractions of NEs and VNEs that the network controller 778 may present as part of different ones of the virtual networks 792. FIG. 7E illustrates the simple case of where each of the NDs 700A-H implements a single NE 770A-H (see FIG. 7D), but the centralized control plane 776 has abstracted multiple of the NEs in different NDs (the NEs 770A-C and G-H) into (to represent) a single NE 7701 in one of the virtual network(s) 792 of FIG. 7D, according to some embodiments of the invention. FIG. 7E shows that in this virtual network, the NE 7701 is coupled to NE 770D and 770F, which are both still coupled to NE 770E.

FIG. 7F illustrates a case where multiple VNEs (VNE 770A.1 and VNE 770H.1) are implemented on different NDs (ND 700A and ND 700H) and are coupled to each other, and where the centralized control plane 776 has abstracted these multiple VNEs such that they appear as a single VNE 770T within one of the virtual networks 792 of FIG. 7D, according to some embodiments of the invention. Thus, the abstraction of a NE or VNE can span multiple NDs.

While some embodiments of the invention implement the centralized control plane 776 as a single entity (e.g., a single instance of software running on a single electronic device), alternative embodiments may spread the functionality across multiple entities for redundancy and/or scalability purposes (e.g., multiple instances of software running on different electronic devices).

Figure 8:
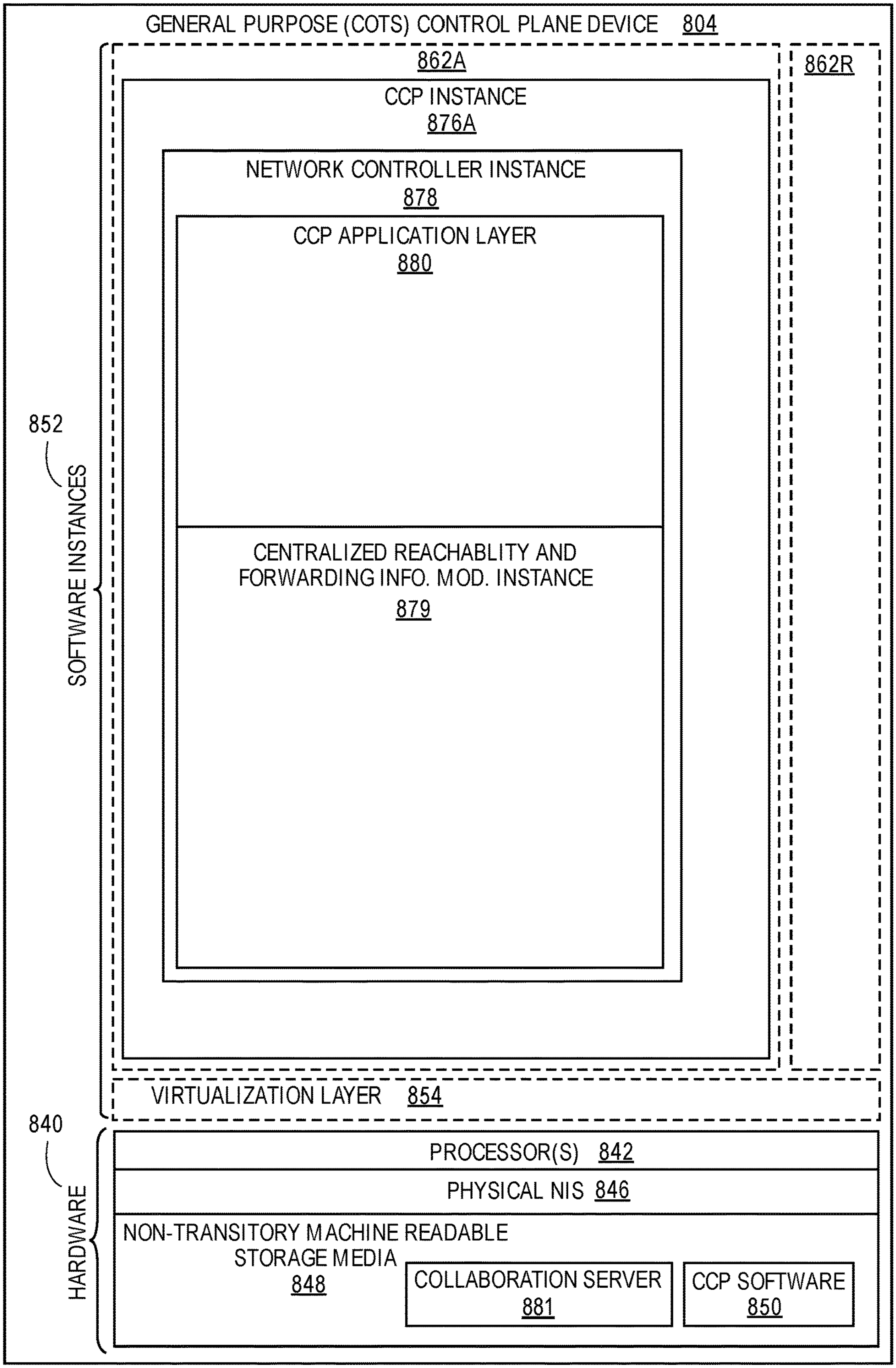
FIG. 8 illustrates a general purpose control plane device with centralized control plane (CCP) software 850), according to some embodiments of the invention.

Similar to the network device implementations, the electronic device(s) running the centralized control plane 776, and thus the network controller 778 including the centralized reachability and forwarding information module 779, may be implemented a variety of ways (e.g., a special purpose device, a general-purpose (e.g., COTS) device, or hybrid device). These electronic device(s) would similarly include processor(s), a set of one or more physical NIs, and a non-transitory machine-readable storage medium having stored thereon the centralized control plane software. For instance, FIG. 8 illustrates, a general purpose control plane device 804 including hardware 840 comprising a set of one or more processor(s) 842 (which are often COTS processors) and physical NIs 846, as well as non-transitory machine readable storage media 848 having stored therein centralized control plane (CCP) software 850.

In some embodiments, the collaboration server 881 can be stored and loaded from the non-transitory machine readable storage media 848 by processors 842 and other resources of the control plane device 804. For example, the collaboration server 881 can be executed as part of a network controller instance 878 along with other elements.

In embodiments that use compute virtualization, the processor(s) 842 typically execute software to instantiate a virtualization layer 854 (e.g., in one embodiment the virtualization layer 854 represents the kernel of an operating system (or a shim executing on a base operating system) that allows for the creation of multiple instances 862A-R called software containers (representing separate user spaces and also called virtualization engines, virtual private servers, or jails) that may each be used to execute a set of one or more applications; in another embodiment the virtualization layer 854 represents a hypervisor (sometimes referred to as a virtual machine monitor (VMM)) or a hypervisor executing on top of a host operating system, and an application is run on top of a guest operating system within an instance 862A-R called a virtual machine (which in some cases may be considered a tightly isolated form of software container) that is run by the hypervisor; in another embodiment, an application is implemented as a unikernel, which can be generated by compiling directly with an application only a limited set of libraries (e.g., from a library operating system (LibOS) including drivers/libraries of OS services) that provide the particular OS services needed by the application, and the unikernel can run directly on hardware 840, directly on a hypervisor represented by virtualization layer 854 (in which case the unikernel is sometimes described as running within a LibOS virtual machine), or in a software container represented by one of instances 862A-R). Again, in embodiments where compute virtualization is used, during operation an instance of the CCP software 850 (illustrated as CCP instance 876A) is executed (e.g., within the instance 862A) on the virtualization layer 854. In embodiments where compute virtualization is not used, the CCP instance 876A is executed, as a unikernel or on top of a host operating system, on the "bare metal" general purpose control plane device 804. The instantiation of the CCP instance 876A, as well as the virtualization layer 854 and instances 862A-R if implemented, are collectively referred to as software instance(s) 852.

In some embodiments, the CCP instance 876A includes a network controller instance 878. The network controller instance 878 includes a centralized reachability and forwarding information module instance 879 (which is a middleware layer providing the context of the network controller 778 to the operating system and communicating with the various NEs), and an CCP application layer 880 (sometimes referred to as an application layer) over the middleware layer (providing the intelligence required for various network operations such as protocols, network situational awareness, and user—interfaces). At a more abstract level, this CCP application layer 880 within the centralized control plane 776 works with virtual network view(s) (logical view(s) of the network) and the middleware layer provides the conversion from the virtual networks to the physical view.

The centralized control plane 776 transmits relevant messages to the data plane 780 based on CCP application layer 880 calculations and middleware layer mapping for each flow. A flow may be defined as a set of packets whose headers match a given pattern of bits; in this sense, traditional IP forwarding is also flow-based forwarding where the flows are defined by the destination IP address for example; however, in other implementations, the given pattern of bits used for a flow definition may include more fields (e.g., 10 or more) in the packet headers. Different NDs/NEs/VNEs of the data plane 780 may receive different messages, and thus different forwarding information. The data plane 780 processes these messages and programs the appropriate flow information and corresponding actions in the forwarding tables (sometime referred to as flow tables) of the appropriate NE/VNEs, and then the NEs/VNEs map incoming packets to flows represented in the forwarding tables and forward packets based on the matches in the forwarding tables.

Standards such as OpenFlow define the protocols used for the messages, as well as a model for processing the packets. The model for processing packets includes header parsing, packet classification, and making forwarding decisions. Header parsing describes how to interpret a packet based upon a well-known set of protocols. Some protocol fields are used to build a match structure (or key) that will be used in packet classification (e.g., a first key field could be a source media access control (MAC) address, and a second key field could be a destination MAC address).

Packet classification involves executing a lookup in memory to classify the packet by determining which entry (also referred to as a forwarding table entry or flow entry) in the forwarding tables best matches the packet based upon the match structure, or key, of the forwarding table entries. It is possible that many flows represented in the forwarding table entries can correspond/match to a packet; in this case the system is typically configured to determine one forwarding table entry from the many according to a defined scheme (e.g., selecting a first forwarding table entry that is matched). Forwarding table entries include both a specific set of match criteria (a set of values or wildcards, or an indication of what portions of a packet should be compared to a particular value/values/wildcards, as defined by the matching capabilities—for specific fields in the packet header, or for some other packet content), and a set of one or more actions for the data plane to take on receiving a matching packet. For example, an action may be to push a header onto the packet, for the packet using a particular port, flood the packet, or simply drop the packet. Thus, a forwarding table entry for IPv4/IPv6 packets with a particular transmission control protocol (TCP) destination port could contain an action specifying that these packets should be dropped.

Making forwarding decisions and performing actions occurs, based upon the forwarding table entry identified during packet classification, by executing the set of actions identified in the matched forwarding table entry on the packet.

However, when an unknown packet (for example, a "missed packet" or a "match-miss" as used in OpenFlow parlance) arrives at the data plane 780, the packet (or a subset of the packet header and content) is typically forwarded to the centralized control plane 776. The centralized control plane 776 will then program forwarding table entries into the data plane 780 to accommodate packets belonging to the flow of the unknown packet. Once a specific forwarding table entry has been programmed into the data plane 780 by the centralized control plane 776, the next packet with matching credentials will match that forwarding table entry and take the set of actions associated with that matched entry.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

For example, while the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method of a collaboration server for identifying cells of a mobile network for machine learning collaboration, the mobile network having a plurality of cells, wherein each cell of the plurality of cells is associated with different edge nodes of the mobile network and with a respective machine learning model for each cell, the method comprising:

managing collection of features for the plurality of cells to generate at least one feature vector for each of the plurality of cells, wherein the features are extracted at the respective machine learning model at each edge node;

determining a cluster of cells within the plurality of cells based on similarity in feature vectors between at least two cells in the plurality of cells;

sending cluster information to each cell of the cluster;

receiving cluster pre-check information from each cell of the cluster, wherein pre-check information of a pair of cells of the cluster is used to determine performance related metrics used to determine whether the pair of cells can collaborate; and determining, based on the received cluster pre-check information, at least a first cell and a second cell in the cluster to exchange information for machine learning model utilized by the first cell and machine learning model utilized by the second cell.

2. The method of claim 1, wherein the managing collection of features, further comprises:

extracting clutter features for each cell of the plurality of cells to form a clutter feature vector for each cell.

3. The method of claim 1, wherein the managing collection of features, further comprises:

receiving feature vectors for training data set meta-features from each cell of the plurality of cells.

4. The method of claim 3, wherein the managing collection of features, further comprises:

receiving feature vectors for model hyper-parameters from each cell of the plurality of cells.

5. The method of claim 4, wherein the managing collection of features, further comprises:

aggregating feature vectors for each cell from at least the feature vectors for training data set meta-features and feature vectors for model hyper-parameters.

6. A network device for executing a collaboration client for identifying cells of a mobile network for machine learning collaboration, the mobile network having a plurality of cells, wherein each cell of the plurality of cells is associated with different edge nodes of the mobile network and with a respective machine learning model for each cell, the network device comprising:

a non-transitory computer-readable medium having stored therein a collaboration client; and a processor coupled to the non-transitory computer-readable medium, the processor to execute the collaboration client, the collaboration client to receive clustering information from a collaboration server, which collaboration server collects features for the plurality of cells to generate at least one feature vector for each of the plurality of cells, wherein the features are extracted at the respective machine learning model at each edge node to generate the clustering information, the collaboration client further to perform a collaboration pre-check with each cluster cell of a cluster identified in the clustering information, wherein pre-check information of a pair of cells of the cluster is used to determine performance related metrics used to determine whether the pair of cells can collaborate, to send pre-check results to the collaboration server, to receive collaboration information from the collaboration server, and to exchange information with one or more cells identified in the collaboration information, the exchanged information for machine learning models utilized by the network device and the one or more cells.

7. The network device of claim 6, wherein the collaboration client is further to calculate feature vectors for training data set meta-features.

8. The network device of claim 6, wherein the collaboration client is further to calculate feature vectors for model hyper-parameters from each cell.

9. The network device of claim 6, wherein the collaboration client is further to aggregate feature vectors to send to the collaboration server.

10. An electronic device to execute a plurality of virtual machines, the plurality of virtual machines to execute a method of a collaboration server for identifying cells of a mobile network for machine learning collaboration, the mobile network having a plurality of cells, wherein each cell of the plurality of cells is associated with different edge nodes of the mobile network and with a respective machine learning model for each cell, the electronic device comprising:

a non-transitory computer-readable medium having stored therein a collaboration server; and a processor to execute the plurality of virtual machines, one of the plurality of virtual machines to execute the collaboration server, the collaboration server to manage collection of features for the plurality of cells to generate at least one feature vector for each of the plurality of cells, wherein the features are extracted at the respective machine learning model at each edge node, to determine a cluster of cells within the plurality of cells based on similarity in feature vectors between at least two cells in the plurality of cells, to send cluster information to each cell of the cluster, to receive cluster pre-check information from each cell of the cluster, wherein pre-check information of a pair of cells of the cluster is used to determine performance related metrics used to determine whether the pair of cells can collaborate, and to determine, based on the received pre-check information, at least a first cell and a second cell in the cluster to exchange information for machine learning model utilized by the first cell and machine learning model utilized by the second cell.

11. The electronic device of claim 10, wherein the managing collection of features, further includes extracting clutter features for each cell of the plurality of cells to form a clutter feature vector for each cell.

12. The electronic device of claim 10, wherein the managing collection of features, further includes receiving feature vectors for training data set meta-features from each cell of the plurality of cells.

13. The electronic device of claim 12, wherein the managing collection of features, further includes receiving feature vectors for model hyper-parameters from each cell of the plurality of cells.

14. The electronic device of claim 13, wherein the managing collection of features, further includes aggregating feature vectors for each cell from at least the feature vectors for training data set meta-features and feature vectors for model hyper-parameters.

15. A computing device to implement a control plane of a software defined networking network, the computing device to execute a method of a collaboration server for identifying cells of a mobile network for machine learning collaboration, the mobile network having a plurality of cells, wherein each cell of the plurality of cells is associated with different edge nodes of the mobile network and with a respective machine learning model for each cell, the computing device comprising:

a non-transitory computer readable medium having stored therein a collaboration server; and a processor coupled to the non-transitory computer readable medium, the processor to execute the collaboration server, the collaboration server to manage collection of features for the plurality of cells to generate at least one feature vector for each of the plurality of cells, wherein the features are extracted at the respective machine learning model at each edge node, to determine a cluster of cells within the plurality of cells based on similarity in feature vectors between at least two cells in the plurality of cells, to send cluster information to each cell of the cluster, to receive cluster pre-check information from each cell of the cluster, wherein pre-check information of a pair of cells of the cluster is used to determine performance related metrics used to determine whether the pair of cells can collaborate, and to determine, based on the received cluster pre-check information, at least a first cell and a second cell in the cluster to exchange information for machine learning model utilized by the first cell and machine learning model utilized by the second cell.

16. The computing device of claim 15, wherein the managing collection of features, further includes extracting clutter features for each cell of the plurality of cells to form a clutter feature vector for each cell.

17. The computing device of claim 15, wherein the managing collection of features, further includes receiving feature vectors for training data set meta-features from each cell of the plurality of cells.

18. The computing device of claim 17, wherein the managing collection of features, further includes receiving feature vectors for model hyper-parameters from each cell of the plurality of cells.

19. The computing device of claim 18, wherein the managing collection of features, further includes aggregating feature vectors for each cell from at least the feature vectors for training data set meta-features and feature vectors for model hyper-parameters.

* * * * *